United States Patent [19]
Watanabe et al.

[11] Patent Number: 5,693,424
[45] Date of Patent: Dec. 2, 1997

[54] ETHYLENIC COPOLYMER THERMOPLASTIC RESIN LAMINATES

[75] Inventors: Kazuyuki Watanabe; Toshiyuki Iwashita; Osamu Miyachi; Katsuaki Tsutsumi, all of Oita, Japan

[73] Assignee: Showa Denko K.K., Tokyo, Japan

[21] Appl. No.: 475,169

[22] Filed: Jun. 7, 1995

Related U.S. Application Data

[62] Division of Ser. No. 73,310, Jun. 8, 1993, Pat. No. 5,453,462.

[30] Foreign Application Priority Data

Jun. 26, 1992 [JP] Japan ................................. 4-168955

[51] Int. Cl.$^6$ .............................. B32B 27/32; B32B 27/34
[52] U.S. Cl. ................................. 428/474.7; 428/476.3; 428/474.9; 428/476.9; 428/515; 428/516; 428/520; 525/240; 525/218
[58] Field of Search .................... 428/515, 516, 428/520, 36.7, 474.4, 36.6, 35.4, 476.3, 474.9, 474.7, 476.9; 525/58, 240, 217, 218

[56] References Cited

U.S. PATENT DOCUMENTS

| | | | |
|---|---|---|---|
| 3,388,190 | 6/1968 | Bryant et al. | 525/218 |
| 3,405,200 | 10/1968 | Yasumura et al. | 525/218 |
| 3,542,749 | 11/1970 | Anspon | 525/293 |
| 3,845,163 | 10/1974 | Murch | 525/183 |
| 4,287,315 | 9/1981 | Meyer et al. | 525/183 |
| 4,289,830 | 9/1981 | Knott, II | 428/475.8 |
| 4,347,337 | 8/1982 | Knott, II | 525/60 |
| 4,407,897 | 10/1983 | Farrell et al. | 428/516 |
| 4,464,443 | 8/1984 | Farrell et al. | 428/688 |
| 4,705,708 | 11/1987 | Briggs et al. | 428/35 |
| 4,957,974 | 9/1990 | Ilenda et al. | 525/301 |
| 4,990,554 | 2/1991 | Chou et al. | 525/58 |
| 5,035,933 | 7/1991 | Ilenda et al. | 428/36.6 |
| 5,202,193 | 4/1993 | Sumi et al. | 428/479.6 |
| 5,380,481 | 1/1995 | Obele, Jr. | 264/510 |

FOREIGN PATENT DOCUMENTS

| | | |
|---|---|---|
| 001 241 | 4/1979 | European Pat. Off. |
| 0059274 | 9/1982 | European Pat. Off. |
| 128 775 | 12/1984 | European Pat. Off. |
| 0 276 111 | 7/1988 | European Pat. Off. |
| 0322891 | 7/1989 | European Pat. Off. |
| 427 388 | 5/1991 | European Pat. Off. |
| 490 562 | 6/1992 | European Pat. Off. |
| 1900636 | 7/1969 | Germany |
| 1 694 988 | 12/1971 | Germany |
| 35-7088 | 6/1960 | Japan |
| 35-10640 | 8/1960 | Japan |
| 37-6975 | 7/1962 | Japan |
| 43-9063 | 4/1968 | Japan |
| 43-21655 | 9/1968 | Japan |
| 43-23766 | 10/1968 | Japan |
| 44-19537 | 8/1969 | Japan |
| 44-29262 | 11/1969 | Japan |
| 49-33945 | 3/1974 | Japan |
| 49-117536 | 11/1974 | Japan |
| 50-123151 | 9/1975 | Japan |
| 51-70254 | 6/1976 | Japan |
| 51-145553 | 12/1976 | Japan |
| 54-28351 | 2/1979 | Japan |
| 54-60348 | 5/1979 | Japan |
| 54-44108 | 12/1979 | Japan |
| 57-170748 | 10/1982 | Japan |
| 59-20345 | 2/1984 | Japan |
| 60-165242 | 8/1985 | Japan |
| 60-184839 | 9/1985 | Japan |
| 60-187550 | 9/1985 | Japan |
| 60-215047 | 10/1985 | Japan |
| 61-73711 | 4/1986 | Japan |
| 61-89239 | 5/1986 | Japan |
| 61-281147 | 12/1986 | Japan |
| 53-88067 | 8/1987 | Japan |
| 62-182030 | 8/1987 | Japan |
| 62-208344 | 9/1987 | Japan |
| 63-304010 | 12/1988 | Japan |
| 1-171833 | 7/1989 | Japan |
| 1-171834 | 7/1989 | Japan |
| 1-253442 | 10/1989 | Japan |
| 1-299851 | 12/1989 | Japan |
| 1-308626 | 12/1989 | Japan |
| 2-47139 | 2/1990 | Japan |
| 1214781 | 12/1970 | United Kingdom |

OTHER PUBLICATIONS

Paper, Film & Foil Converter, Oct. 1985, pp. 54–60.
COEX '89, held by Scotland Business Inc. (U.S.A.), pp. 267–289, 1984.
Future–PAK '90, P125, Ryder Associates Inc. (U.S.A.), pp. 127–132, 1990.
Polymer Digest, Jul. 1984, pp. 116–117.
Polymer Digest, Jun. 1985, pp. 43–48.
Kobunshi (Polymer), Kuroda, vol. 28, No. 10, pp. 714–717, 1979.
Food Package, Nov. 1984, pp. 82–90.
Food Package, Dec. 1984, pp. 67–72.
Kobunshi Ronbunshu, vol. 35, No. 12, pp. 795–800, 1978.

*Primary Examiner*—Paul J. Thibodeau
*Assistant Examiner*—D. Lawrence Tarazano
*Attorney, Agent, or Firm*—Armstrong, Westerman, Hattori, McLeland & Naughton

[57] ABSTRACT

A multilayered laminate which comprises (A) at least one thermoplastic resin layer of an ethylenic copolymer having ethylene and at least one of acrylamide derivatives, methacrylamide derivatives, ester monomers, ether compounds, acid compounds having an unsaturated bond between carbon atoms, and mixtures thereof; (B) other thermoplastic resin layers; and (C) a hydroscopic gas barrier intermediate layer and a method of improving the transparency of polypropylene.

4 Claims, No Drawings

ETHYLENIC COPOLYMER THERMOPLASTIC RESIN LAMINATES

This is a Divisional application of Ser. No. 08/073,310 filed Jun. 8, 1993 now U.S. Pat. No. 5,453,462.

BACKGROUND OF THE INVENTION

1) Field of the Invention

The present invention relates to a thermoplastic resin composition and laminates thereof, and more particularly to a thermoplastic resin composition useful as a raw material for moldings having distinguished characteristics such as mechanical strength, impact strength, elasticity, gas barrier property, adhesiveness, antistaticability, low temperature heat sealability, transparency, coatability, miscibility, moldability, radiation resistance, etc., and to laminates thereof.

2) Prior Art

Thermoplastics have been widely used in fields of industrial materials, structural materials, medical instrument materials, packaging materials for food, medicines, cosmetics, industrial articles, etc., laminated steel plates, automobile materials, etc., on the basis of their characteristics. However, they still have problems due to recent increasing demands for higher quality.

Polyolefins have been used in various fields owing to their low cost, high mechanical strength, good sanitation, and good moldability. However, polyolefins have poor oil resistance and gas barrier property, and when they are used as containers for food such as mayonnaise, soy sauce, etc., it is impossible to preserve these kinds of food for a long time. When they are used as gasoline containers, there are such drawbacks as a large amount of gasoline leakage and swelling of containers leading to container deformation. To overcome the drawbacks, it has been so far proposed to laminate the polyolefins with polyester (which may be hereinafter referred to as PET), polyamide (which may be hereinafter referred to as PA), a saponification product of ethylene-vinyl acetate copolymer (which may be hereinafter referred to as EVOH), aluminum foils, glass or the like through an adhesive layer, or to vapor-deposit a gas barrier material of metal, metal oxide or the like onto the polyolefins.

For example, it is known to conduct lamination by applying a dry lamination adhesive such as a polyurethane-based adhesive, a polyacrylic adhesive or a polyester-based adhesive, or to conduct co-extrusion laminating polyolefins graft-polymerized or copolymerized with an unsaturated carboxylic acid or its anhydride as an adhesive resin for lamination. Furthermore, it is known to use olefins graft-polymerized with an acrylic resin derivative or the like as an adhesive resin for the polyolefin and EVOH (JP-A 60-165242), to use a mixture of the graft-polymerized polyolefins with carboxy-modified olefinic polymers or copolymers (JP-A 60-187550), or to use a mixture of olefinic polymers or copolymers with the grafted polyolefins (JP-A 60-184839). However, delamination of the laminates obtained even by these processes has been often observed owing to unsufficient adhesion strength.

Polypropylene is generally cheap and is used in various fields on the basis of its distinguished characteristics such as distinguished transparency, mechanical strength, heat resistance, gloss, chemical resistance, oil resistance, rigidity, flex fatigue resistance, etc. Among polypropylene (which may be hereinafter referred to as PP), homo PP has a high glass transition temperature and thus has such drawbacks as high brittleness at a low temperature, easy breakage, poor transparency, etc. PP has such drawbacks as a poor coatability, a high susceptibility considerable deterioration of physical properties when subjected to irradiation of radiation, or a poor heat sealability at a low temperature. In attempts to overcome these drawbacks, for example, in attempts to improve the transparency, it is known to add a dibenzylidene sorbitol derivative as a nucleating agent to PP and obtain the transparency due to the effect of the nucleating agent, as disclosed in Polymer Digest, July issue (1984), page 116 and Polymer Digest, June issue (1985) page 43. However, these procedures still have such problems as decomposition of the nucleus-making agent during the molding, emission of disagreeable odor, decrease in the impact resistance due to the effect of the nucleus-making agent, etc.

Furthermore, it is known to use special molding procedures, for example, to add hydrogenated terpene resin and a nucleating agent to PP, followed by molding and quenching, thereby to obtain a transparent sheet (JP-A 1-171833 and JP-A 1-171834) or to add an ethylene/α-olefin copolymer to PP, followed by molding and quenching below 60° C. (JP-A 1-299851). However, these procedures require a special molding machine, because it is difficult to readily obtain a molding of high transparency by ordinary molding machines.

In attempts to improve the impact resistance, it is known to add 5 to 20% of polyisobutene to PP (JP-B 35-10640), to add 5 to 20% of ethylene/propylene copolymer (JP-B 35-7088), to add a lower pressure process polyethylene of high molecular weight to PP (JP-B 37-6975), or to add polyethylene (which may be hereinafter referred to as PE) and ethylene/propylene rubber to PP, thereby making the so called propylene/ethylene block copolymer [Kuroda: Kobunshi (Polymer), Vol. 28, No. 10, page 714 (1979)]. However, these procedures still have such problems as poor luster and poor transparency.

Furthermore, it has been proposed to add an ethylene-vinyl ester copolymer and/or ethylene-acrylate copolymer to PP (JP-A 51-145553), or to add a modified specific ethylene-propylene copolymer obtained by graft polymerization with an unsaturated dicarboxylic acid or its anhydride to PP (JP-A 61-89239). These procedures still have such problems as a poor effect on the improvement of coatability and a poor compatibility.

Among polyolefins, PP has an excellent flexing characteristic (hinge characteristic), but the flex crease turns white, or when a tension is applied to PP, the site on which the tension has been applied turns white. That is, a phenomenon of local whitening, so called stress whitening, appears.

To prevent the whitening of PP, it has been so far proposed to add a lubricant or a plasticizer to PP, followed by kneading. However, this procedure has such problems as appearance of bleeding and blooming and deterioration of transparency.

Furthermore, in the field of medical packaging, PP moldings are usually irradiated with gamma ray of cobalt 60 or electron beams as a sterilizing means. However, such a sterilization treatment of PP deteriorates PP, that is, lowers the physical properties such as impact resistance, stretching elongation, etc. To solve the problems, various procedures including modification of PP have been proposed (JP-A 60-215047 and JP-A 61-73711). However, all these procedures have such drawbacks as insufficient transparency, and insufficient effect of control on decreases in physical properties such as impact resistance and stretching elongation after the irradiation with radiation beams.

Furthermore, it has been proposed to improve the heat sealability of PP at a low temperature by adding polybutene-1, or an ethylene/propylene elastomer, or an ethylene/propylene/butene-1 copolymer to PP (JP-A 54-28351 and JP-A 54-603498). However, these procedures still have such a drawback as insufficient heat sealability at a low temperature.

Since polyvinyl alcohol (which may be hereinafter referred to as PVA) has a melting temperature and a heat decomposition temperature very close to each other, it has been impossible to conduct melt-extrusion molding of PVA. The PVA film is soft and tough under a high humidity, but loses the flexibility under a low humidity to become brittle and thus readily breakable. It has been proposed to solve these problems, for example, by adding EVOH to PVA (JP-A 49-33945) or by adding other polymers than polyolefins to modified PVA (JP-A 49-117536) or by other means (JP-A 50-123151). However, all these procedures still have insufficient melt moldability and a poor gas barrier property.

Generally, PA is tough, but an impact resistance as one of indicators of toughness is considerably increased by moisture adsorption. The impact resistance of PA right after the molding or in the dry state during the winter season or at a low temperature is not always satisfactory. That is, cracks are often generated on the PA moldings.

In attempts to improve the impact resistance of PA, it is known to add a copolymer resin of polyolefin and $\alpha,\beta$-unsaturated carboxylic acid or its ester, graft-modified polyolefin resin with an $\alpha,\beta$-unsaturated carboxylic acid represented by maleic anhydride, ionomer copolymer resin of ethylene and methacrylic acid or its ester ionized by Na, Zn, Mg, or the like, or graft-modified ethylene/propylene/diene copolymer rubber with maleic anhydride to PA (JP-A 51-70254, JP-B 44-29262, U.S. Pat. No. 3,845,163 and JP-B 54-44108). However, these procedures still have such problems as (1) poor compatibility with PVA, (2) local generation of gel by an organic peroxide during the graft modification, (3) generation of much gel by reaction with PA, when the polymer contains unreacted monomers, resulting in yellow discoloring, and (4) decrease in the gas barrier property by blending, which follows the addition.

EVOH is used as packaging materials for food, cosmetic or medicines, which require a gas barrier property particularly to oxygen.

However, EVOH is hard, very brittle and readily breakable. Since EVOH has hydroxyl groups in the molecule, it can readily absorb moisture such as water and water vapors, and its gas barrier property is much more deteriorated by moisture absorption. To overcome these drawbacks, EVOH is used as a multilayer laminate by laminating EVOH with one or more thermoplastic resins, such as polyolefins (for example, PE, PP, etc.), PET, polystyrene, polyvinyl chloride, etc.

The lamination procedure includes co-extrusion molding process or extrusion lamination molding process for extruding a thermoplastic resin such as polyolefins, etc., EVOH and resin for bonding these polymers, thereby making a laminate, a dry lamination molding process for individual molding of these polymers, followed by lamination, a solution coating molding process, where the resulting laminate is in the form of sheets, films or bottles.

The laminate sheets are used to serve as container packages, and thus the raw sheets of multilayer laminates are subjected to a secondary heat molding processing including high temperature stretching such as vacuum molding or compressed air molding.

In the secondary processing, the molding conditions mostly depend on the polymer resin having an intermediate melting point among the constituent materials for the multilayer laminates. That is, the secondary heat molding processing is carried out under these molding conditions.

Thus, EVOH, which usually belongs to the material species having a high melting point, is often subjected to the secondary processing under in appropriate molding conditions, and thus fine spaces (so called voids) or cracks are liable to form in the layers. Furthermore, such voids, cracks or local unevenness in the thickness, etc. are liable to form due to higher crystallization rate of EVOH.

The laminate films undergo flexing movements in the pouch-making step, packaging step, distribution steps, etc., resulting in occurrence of pinholes or cracks in the EVOH layer. Thus, the gas barrier property or EVOH is often deteriorated considerably.

In attempts to solve these problems, a method for blending EVOH with PA (JP-A 59-20345), a method for mixing EVOH with glycerin (JP-A 53-88067), a method for blending EVOH with lithium chloride, etc. (JP-A 61-281147), etc. have been proposed. However, the blending of EVOH with PA has a problem that PA reacts with EVOH during the melt molding, resulting in formation of gel or fish-eyes. The blending with a plasticizer such as glycerin, etc. has a problem that the plasticizers have a poor compatibility with EVOH and thus bleeding of these compounds takes place with time, i.e. the plasticizers move towards the boundary surface to the adhesive resin layer and the bonding strength to the layer is lowered with time. Furthermore, the blending of EVOH with lithium chloride, etc. has a problem that the distribution is often poor at the blending, or more cracks or pinholes are generated due to voids formed when the added compounds are subjected to heat stretching treatment.

As described above, pinholes, cracks, unevenness in thickness, etc. are very liable to appear when a multilayered laminate of EVOH is formed or processed into containers, and consequently the gas barrier property is largely deteriorated.

Furthermore, the multilayered laminate has another problem of effective utilization of scraps. For example, when a multilayered laminate film is processed into containers, burrs are formed up to about 40%.

As a process for recovering such scraps, it has been attempted to reuse a regrind obtained by grinding the foregoing scraps. For example, there are suggested a process for providing a regrind layer composed of the regrind on the multilayer laminate or a process for mixing the regrind in the outermost polyolefin layer, etc.

However, since polyolefin and gas barrier resin generally have a poor miscibility between both, and polyolefin and gas barrier resin in the regrind form an unhomogenous mixture, the following troubles during mold-processing at the time of recovery occur. That is, when a regrind layer is provided, adhesion between the regrind layer and gas barrier layer is inferior, so that peeling readily takes place, or the part of gas barrier resin in regrind is readily peeled off as fine fibrous pieces, or foreign matters readily result from uneven interlayer separation. Such foreign matters increase in a prolonged operation, resulting in formation of projections or granular structures on the ultimate products, when observed from the outermost layer side of multilayered laminate, and thus the projections or granular structures considerably deteriorate the appearance of the multilayered laminate, or in the worst case these projections or granular structures break through the resin layers at the outer side or lower the mechanical strength.

In the coextrusion molding, a known adhesive resin is generally used as a miscibility agent for the regrind component. However, such use of the known resin is not satisfactory yet, because of poor miscibility with EVOH or PA, and unreacted monomers, if present in the adhesive resin, readily react with EVOH or PA, resulting in much formation of gels and yellow discoloring as problems.

Multilayered laminates using a hygroscopic gas barrier of EVOH, PA, PVA or the like have such characteristics that permeation of a gas such as oxygen, etc. can be sufficiently suppressed at a low humidity to prevent oxidation of contents in containers, and the quality of the contents can be stabilized for a prolonged time. However, when the multilayered laminates are used in boiling water at 90° to 135° C. as in the form of retort food packages, water permeates into the multilayered laminates from the outermost layer and is absorbed into the gas barrier layer. As a result, the gas permeation resistance of the gas barrier layer is abruptly lowered. That is, the multilayered laminates cannot be used in the pouch food application, etc.

For example, when a multilayered laminate consisting of a PP layer, an adhesive resin layer and an EVOH layer and having a total thickness of about 100 μm is subjected to a retort treatment in boiling water at least at 120° C., water absorption of the EVOH layer amounts to 7% by weight or more, and the oxygen permeation increases to 1,000 times as much as that before the retort treatment in some cases.

In attempts overcome these problems, it is proposed, for example, to add a drying agent comprising an inorganic metal salt to the adhesive layer that binds the gas barrier layer to the outer layer so that the adhesive layer can capture the permeated water, thereby preventing the deterioration of the gas barrier property (European Patent No. 59274, U.S. Pat. Nos. 4,407,897 and 4,464,443; JP-A 57-170748). However, even in this proposed procedure, the interlayer bonding strength is decreased between the adhesive layer and the gas barrier layer, or the use is inevitably limited due to the presence of the inorganic metal salt as foreign matters.

Furthermore, a method for adding a phenol compound to improve the water resistance (U.S. Pat. Nos. 4,347,337 and 4,289,830), and a method for forming the outermost layer of polycarbonate resin having a good water vapor permeability or PA or its mixture in close proximity to the EVOH layer (JP-A 1-253442; JP-A 1-308626; European Patent No. 322891) are known. However, these methods may be effective for thin products such as films, but not for thick product such as sheets, bottles, etc. and they are costly. In case of polycarbonate resin, it is difficult to conduct multilayered extrusion and thus a special extruder is required.

On the other hand, in multilayered laminates containing an EVOH layer, attempts have been made to provide an EVOH layer at the outer side to accelerate restoration of the gas barrier property after the retort treatment [Paper, Film & Foil Converter, October issue, page 54 (1985); Food Package, November issue, page 82 (1984); ibid, December issue, page 67 (1985); COEX '89, page 267 (1989), held by Scotland Business Research, Inc. (USA)]. However, in these attempts, the resulting laminates take an asymmetrical multilayer structure in the thickness direction, and thus requires an additional extruder in the molding, in contrast to the coextrusion molding for producing a symmetrical multilayer structure in the thickness direction, which requires only one extruder for the outer layer resin. Thus, the molding is costly and the restoration of the gas barrier property is not satisfactory yet.

Recently, an attempt has been made to use EVOH having a high content of ethylene units and set the EVOH layer to a large thickness in advance in anticipation of a deterioration of the gas barrier property due to the retort treatment [Future-Pak '90, page 125 (1990), Ryder Associates, Inc. (USA)]. However, the attempt has such a disadvantage as an inevitable high cost.

Still furthermore, a method for blending a polymer reticular structure such as a reticular structure of vinyl alcohol-acrylate copolymer, etc. into any one of the oxygen barrier layer, the outer layer and the adhesive layer (JP-A 62-182030; JP-A 62-208344), and a method for blending an inorganic powder such as mica powder, sericite powder, etc. into the outer layer and the EVOH layer (JP-A 2-47139) have been proposed. However, the former has a problem in the molding due to poor melt moldability and heat stability of the polymer reticular structure, whereas the latter has problems due to the hardness and the resulting brittleness caused by the blending of inorganic powder.

SUMMARY OF THE INVENTION

An object of the present invention is to provide a useful thermoplastic resin composition as a raw material for moldings having distinguished characteristics such as mechanical strength, impact strength, elasticity, gas barrier property, adhesiveness, antistaticbility low temperature heat sealability, transparency, printability, compatibility, moldability, radiation resistance, etc. and its laminates.

As a result of extensive studies to solve the problems of prior art, the present inventors have found that a thermoplastic resin composition comprising an ethylenic copolymer containing at least one of acrylamide derivative units and methacrylamide derivative units, and other thermoplastic resin can solve the problems and have established the present invention.

According to the present invention, there is provided a thermoplastic resin composition, which comprises:

(A) an ethylenic copolymer containing at least one of acrylamide derivative units and methacrylamide derivative units, and (B) other thermoplastic resin.

Furthermore, the present invention provides a multilayered laminate, which comprises:

(A) at least one resin layer comprising an ethylenic copolymer containing ethylene units and at least one of acrylamide derivative units and methacrylamide derivative units, (B) a layer of other thermoplastic resin, and (C) a hydroscopic gas barrier layer as an intermediate layer, laid one upon another.

DETAILED DESCRIPTION OF THE INVENTION

Ethylenic copolymers containing at least one of acrylamide derivative units and methacrylamide derivative units for use as component (A) in the thermoplastic resin composition of the present invention can be prepared according to the ordinary procedures disclosed in Kobunshi Ronbunshu (Polymer Articles), Vol. 35, No. 12, page 795 (1978); U.S. Pat. No. 3,629,209; JP-B 43-21655; JP-B 44-19537; JP-B 43-23766; JP-B 43-9063; JP-A 63-304010. The procedures include bulk polymerization, solution polymerization, suspension polymerization, emulsion polymerization, etc. Bulk copolymerization is the most popular procedure, where the ethylenic copolymer is prepared by radical polymerization at a temperature of 100° to 300° C. and a pressure of 700 to 3,000 atmospheres. A preferable pressure range is 1,000 to 2,500 atmospheres and a preferable temperature range is 150° to 270° C. as an average temperature in the reactor.

Melt flow rate (which will be hereinafter referred to as MFR) at 190° C. of the ethylenic copolymers for use in the present invention is preferably less than 300 g/10 minutes. To improve the bendability with other thermoplastic resin, a portion of the thermoplastic resin can be used as blended therewith in advance, and in that case basically it is not objectionable that MFR exceeds 300 g/10 minutes.

Acrylamide derivatives and methacrylamide derivatives that constitute the ethylenic copolymers means N-alkyl derivatives and N,N-dialkyl derivatives, and specifically include, for example, N-methylacrylamide, N-ethylacrylamide, N-n-propylacrylamide, N-isopropylacrylamide, N-n-butylacrylamide, N-isobutylacrylamide, N-t-butylacrylamide, N,N-dimethylacrylamide, N,N-diethylacrylamide, N-ethylmethacrylamide, N-n-propylmethacrylamide, N-t-butylmethacrylamide, N,N-dimethylacrylamide, N,N-diethylmethacrylamide, etc., which can be used alone or in mixture. Above all, N-ethylacrylamide, N-isopropylacrylamide, N-t-butylacrylamide, N,N-dimethylacrylamide, N,N-diethylacrylamide, N-n-propylacrylamide, and N-t-butylacrylamide are preferable.

Content of acrylamide derivative units and methacrylamide units in the ethylenic copolymer is usually 0.01 to 50% by weight, preferably 1 to 45% by weight.

The ethylenic copolymer for use in the present invention can contain ethylene, at least one of acrylamide and methacrylamide and units derived from other polymerizable monomer. The other polymerizable monomer includes, for example, ester compounds, acid compounds, ether compounds, hydrocarbon compounds, etc., each having an unsaturated bond.

Ester compounds having an unsaturated bond include, for example, vinyl acetate, methyl acrylate, ethyl acrylate, propyl acrylate, butyl acrylate, hexyl acrylate, octyl acrylate, lauryl acrylate, benzyl acrylate, N,N-dimethylaminoethyl acrylate, methyl methacrylate, ethyl methacrylate, propyl methacrylate, butyl methacrylate, hexyl methacrylate, octyl methacrylate, lauryl methacrylate, N,N-dimethylaminoethyl methacrylate, methyl fumarate, ethyl fumarate, propyl fumarate, butyl fumarate, dimethyl fumarate, diethyl fumarate, dipropyl fumarate, dibutyl fumarate, methyl maleate, ethyl maleate, propyl maleate, butyl maleate, dimethyl maleate, diethyl maleate, dipropyl maleate, dibutyl maleate, etc.

Acid compounds having an unsaturated bond include, for example, acrylic acid, methacrylic acid, maleic acid, fumaric acid, etc. Ether compounds having an unsaturated bond include, for example, methylvinyl ether, ethylvinyl ether, propylvinyl ether, butylvinyl ether, octadecylvinyl ether, phenylvinyl ether, etc. Hydrocarbon compounds having an unsaturated bond include, for example, styrene, norborene, butadiene, and further acrylonitrile, methacrylonitrile, acrolein, crotonaldehyde, trimethoxyvinylsilane, vinyl chloride, vinylidene chloride, etc.

Basically it is preferable that the polymerizable monomer will not react with the amide groups of acrylamide derivatives and methacrylamide derivatives, but when its amount is selected in view of the stoichiometric amount, it is possible to use monomers reactable with these derivatives. One or more of such polymerizable monomers can be used in accordance with desired applications. Content of the polymerizable monomer or monomers is not more than 40% by weight. Above 40% by weight, the characteristics proper to the ethylenic copolymer will be deteriorated.

The resin composition can contain other thermoplastic resin as component (B). The other thermoplastic resin (B) includes, for example, polyolefin including PE, PP and EVOH, halogen-containing polymers, thermoplastic resin containing unsaturated carboxylic acid or its anhydride, PVA, PA, PET, polyacetal, polycarbonate, polyphenylene oxide, polysulfone, etc.

(1) In Case that the Component (B) is Polyolefin:

Preferable polyolefin includes, for example, PE, PP, polyisoprene, polybutene, poly-3-methylbutene-1, poly-4-methylpentene-1, polybutadiene, copolymers containing constituent units of the foregoing polymers, such as ethylene/propylene copolymer, block copolymers of straight chain, low density polyethylene or propylene/ethylene containing butene-1, 4-methylpentene-1, hexene-1, octene-1, or the like as a comonomer, or copolymer of ethylene/vinyl acetate, or mixtures of these polymers.

The thermoplastic resin composition of the present invention, which comprises (A) ethylenic copolymer and (B) polyolefin, has a higher bonding strength per se than that of the so far employed copolymer of ethylene and unsaturated carboxylic acid or its anhydride, or graft polymer obtained by graft modification of the polyolefin with an unsaturated carboxylic acid or its anhydride in the presence of an organic peroxide.

It is necessary that the total resin composition of the present invention contains 0.05 to 40% by weight of acrylamide derivative units and methacrylamide derivative units, which constitute the ethylenic copolymer. Below 0.05% by weight, no such a high bonding strength is obtained, whereas above 40% by weight the water absorption is increased, resulting in an extrusion molding trouble.

Furthermore, the present thermoplastic resin composition can contain a rubbery substance. Particularly when PP is used as component (B) thermoplastic resin, the bonding strength is more improved by use of the rubbery substance. Examples of the rubbery substance include styrene/butadiene rubber or its hydrogenated rubber, acrylonitrile/butadiene rubber or its hydrogenated rubber, butyl rubber, chloroprene rubber, silicone rubber, acryl rubber, urethane rubber, polybutadiene rubber, ethylene/propylene rubber, ethylene/propylene/diene terpolymer, polyisobutylene rubber, polybutene-1 rubber, etc. Furthermore, copolymers of ethylene with α-olefin such as propylene, butene-1, 4-methylpentene-1, octene, etc., for example, low crystalline polyethylene having a lower density (which may be hereinafter referred to as ULD or VLDPE) than that of the ordinary low density polyethylene can be used as a rubbery substance. Above all, copolymer rubber of ethylene with α-olefin such as propylene, butene-1, or 4-methylpenten-1 is preferable in the field of food package from the sanitary viewpoint. In the field of industrial packages, the ethylene/α-olefin/diene terpolymer is preferable. Still furthermore, it is preferable that the ethylene/α-olefin copolymer rubbery substances contain not more than 0.2% by weight of very low molecular weight components having a molecular weight of particularly not more than 2,000.

The present resin composition contains usually 3 to 50% by weight, preferably 5 to 40% by weight, more preferably 10 to 30% by weight of the rubbery substance. The content of the rubbery substance is selected in view of the improvement effect on the bonding strength between the resin layers of the laminate, practical physical properties, moldability, etc. Below 3% by weight, the improvement effect on the bonding strength is not satisfactory, whereas above 50% by weight the characteristics of the adhesive layer such as stiffness, heat resistance, etc. are lost.

The present resin composition has a good bonding strength particularly between polyolefin and EVOH, PA, PET or metal.

(2) In Case of Thermoplastic Resin Containing an Unsaturated Carboxylic Acid or its Anhydride as Component (B):

Thermoplastic resin containing an unsaturated carboxylic acid or its anhydride is the component (B) mentioned in (1) polyolefin case, which are further copolymerized into the polymer molecular chains or graft-modified with dicarboxylic acids or their anhydrides such as maleic acid or maleic anhydride, or monocarboxylic acids such as methacrylic acid or acrylic acid. In this case, the resulting thermoplastic resin composition of the present invention has a distinguished bonding strength and also can be blended with a rubbery substance as in (1) polyolefin case.

(3) In Case of PP as Component (B):

PP as component (B) in the thermoplastic resin composition of the present invention includes homo PP, ethylene/propylene random PP, ethylene/propylene block PP and their mixtures. When ethylene/propylene random PP or ethylene/propylene block PP is used rather than homo PP, a better miscibility with the ethylenic copolymer as component (A) can be obtained, whereas, when homo PP is used, better transparency can be obtained.

It is necessary that the present thermoplastic resin composition contains (A) 1 to 70% by weight of ethylenic copolymer and (B) 99 to 30% by weight of PP. Below 30% by weight of PP, the characteristics proper to PP may be deteriorated in some cases, whereas above 99% by weight no improvement effects are obtained on the transparency, impact resistance, radiation resistance, coatability, etc. Thus, PP is not practical outside the above-mentioned range. On the other hand, below 1% by weight of ethylenic copolymer, no improvement effects are obtained on the transparency, impact resistance, radiation resistance, coatability, etc., whereas above 70% by weight the characteristics proper to PP are deteriorated and thus the ethylenic copolymer is not practical outside the above-mentioned range. 2 to 60% by weight of ethylenic copolymer and 40 to 98% by weight of PP are preferable.

In this case, not more than 50% by weight of other thermoplastic resin such as polyethylene can be blended with the present thermoplastic resin composition on the basis of the total mixture.

In this case, a thermoplastic resin composition useful as a raw material for moldings having distinguished impact resistance, mechanical strength, transparency, coatability, low temperature sealability, radiation resistance, etc. can be obtained without any deterioration of characteristics proper to PP.

(4) In Case of PVA as Component (B):

In the present invention, polyvinyl alcohol (PVA) includes partial or complete saponification products of polyvinyl acetate, or partial or complete saponification products of copolymers of vinyl acetate with radical-polymerizable monomers such as olefins having 4 or more carbon atoms, vinyl carboxylate, alkylvinyl ether, acrylate ester, acrylamide or its derivatives, unsaturated carboxylic acids, etc., i.e. so-called modified polyvinyl alcohol resins (modified PVA), and can be prepared according to the well known procedure, i.e. by bulk polymerization, solution polymerization, emulsion polymerization, or suspension polymerization, where usually the solution polymerization is preferable, followed by saponification reaction of the thus polymerized polyvinyl acetate or its copolymers with an alkali catalyst or an acid catalyst, thereby obtaining PVA.

The thus obtained PVA has a degree of polymerization of preferably 50 or more, more preferably 200 to 2,000 from the viewpoint of melt fluidity and mechanical strength. On the other hand, the saponification degree of vinyl acetate in the polyvinyl acetate or vinyl acetate copolymer is 50% by more or more, preferably 70% by mole or more from the viewpoint of gas barrier property.

The present thermoplastic resin composition can provide good melt moldability, gas barrier property and mechanical strength.

(5) In Case of PA as Component (B):

PA for use as component (B) in the present thermoplastic resin composition is not particularly limited, and various kinds of PA can be used. For example, ring-opened lactam polymers, self-polycondensation products of ε-amino acid, polycondensation products of dibasic acids with diamines, etc. can be mentioned. Specifically, polymers of ε-caprolactam, aminolactam, enantholactam, 11-aminoundecanoic acid, 7-aminoheptanoic acid, 9-aminononanoic acid, α-pyrrolidone, α-piperidone, etc., polycondensation products of diamines such as hexamethylenediamine, monamethylenediamine, undecamethylenediamine, dodecamethylenediamine, metoxylenediamine, etc. with dibasic acids such as terephthalic acid, isophthalic acid, adipic acid, sebacic acid, dodecanedibasic acid, glutaric acid, etc., or their copolymers can be mentioned. More specifically, nylon-4, nylon-6, nylon-7, nylon-8, nylon-11, nylon-12, nylon-6,6, nylon-6,9, nylon-6, 10, nylon-6,11, nylon-6,12, nylon-MXD, etc. can be mentioned.

The present thermoplastic resin composition can contain other thermoplastic resin besides the components (A) and (B).

As to the mixing ratio of the components (A) and (B) in the present thermoplastic resin composition, it is necessary that the present thermoplastic resin composition has (A) 2 to 85% by weight of ethylenic copolymer and (B) 98 to 15% by weight of PA. Below 2% by weight of ethylene copolymer, no such effect of the present invention will be obtained, when blended with PA, whereas above 85% by weight characteristics proper to PA, such as gas barrier property, etc. will be unpreferably deteriorated. It is preferable that the present thermoplastic resin composition contains 5 to 70% by weight of ethylenic copolymer.

In case of adding other thermoplastic resins besides the components (A) and (B), 1 to 90% by weight, preferably 5 to 80% by weight, of the other thermoplastic resin can be added to the thermoplastic resin composition containing PA and the ethylenic copolymer on the basis of the thermoplastic resin composition. The other thermoplastic resin can be merely blended with the thermoplastic resin composition containing PA and the ethylenic copolymer. From the viewpoint of gas barrier property, the present thermoplastic resin composition must contain at least 10% by weight, preferably at least 15% by weight, of PA.

In this case, a thermoplastic resin composition useful as a raw material for moldings having a distinguished gas barrier property, a good balance between the impact resistance and the rigidity, a high mechanical strength, etc. can be obtained.

(6) In Case of EVOH as Component (B):

In the present invention, saponification products of olefin-vinyl acetate copolymer (which may be thereinafter referred to merely as "saponification product") refer to saponification products of ethylene-vinyl acetate copolymer (EVOH), saponification products of propylene-vinyl acetate copolymer, etc., among which EVOH is preferable for use in the present invention due to its ready preparation.

In the present invention, EVOH containing 15 to 60% by mole of ethylene component and having a saponification degree of vinyl acetate component of at least 90% is used. Below less than 15% by mole of ethylene component the melt moldability is lowered, and below a saponification degree of vinyl acetate component of 90% the gas barrier property is deteriorated. Preferably EVOH containing 25 to 50% by mole of ethylene component and having a saponification degree of vinyl acetate component of at least 96% is used.

EVOH may contain, besides ethylene and vinyl acetate (or vinyl alcohol derived from saponification of vinyl acetate), unsaturated acids such as acrylic acid, methacrylic acid, crotonic acid, maleic acid, etc. or their alkyl esters, or α-olefins such as propylene, butene, α-decene, α-octadecene, etc. as comonomers in such a small amount as not to deteriorate the major characteristics of saponification products.

As to the mixing ratio of the present thermoplastic resin composition comprising (A) ethylenic copolymer and (B) saponification product, the present thermoplastic resin composition contains (A) 90 to 1% by weight of ethylenic copolymer and (B) 10 to 99% by weight of saponification product. Below 10% by weight of saponification product no gas barrier property will be obtained, whereas above 99% by weight no effects will be obtained on prevention of pinhole and crack development, prevention of uneven thickness, improvement of heat stretchability, etc. Preferably, 20 to 96% by weight of saponification product is used in the present invention.

Melt index (MFR under a load of 1.16 kg at 230° C. according to JIS-K 6758) of the present thermoplastic resin composition is not particularly limited, and is appropriately in a range of 0.1 to 50 g/10 min. for a resin composition for extrusion molding, though dependent on type of molding procedures.

In the present thermoplastic resin composition, better flexibility, impact resistance and gas barrier property can be obtained than those of single EVOH.

In this case, it is preferable that the thermoplastic resin composition comprises (A) ethylenic copolymer comprising ethylene and at least one of acrylamide derivative unit and methacrylamide derivative unit, (B) at least one of saponification product and PA, and a thermoplastic resin containing 0.001 to 20% by weight of a unit derived from unsaturated dicarboxylic acid or its anhydride, and another thermoplastic resin. In this thermoplastic resin composition, at least one of saponification product and PA is used as component (B) to improve the compatibility of the respective components. The saponification product used in this case includes, for example, EVOH, saponification products of ethylene/propylene/vinyl acetate copolymer, saponification products of propylene/vinyl acetate copolymer, etc. among which EVOH is preferably used particularly from the viewpoint of ready polymerization. It is also preferable that EVOH contains at least 15% by mole, preferably 15 to 60% by mole, of ethylene component and has a saponification degree of vinyl acetate component of at least 90%. Below 15% by mole of ethylene component, the melt moldability will be unsatisfactory, whereas above 60% by mole the gas barrier property will be deteriorated. When the saponification degree is less than 90%, the gas barrier property will be also deteriorated. EVOH containing 25 to 50% by mole of ethylene component and having a saponification degree of vinyl acetate component of at least 90% is particularly preferable. EVOH can contain, besides the ethylene component and the vinyl acetate component or vinyl alcohol unit derived by saponification of the vinyl acetate, unsaturated acids such as acrylic acid, methacrylic acid, crotonic acid, moleic acid, etc. or their alkyl esters, α-olefins such as propylene, butene, α-decene, α-octadecene, etc., as comonomer components.

In this case, it is desirable that the content of ethylenic copolymer as component (A) is 1 to 40% by weight, preferably 2 to 35% by weight, more preferably 4 to 20% by weight. Below 1% by weight, the thermoplastic resin composition will be non-uniform, whereas above 40% by weight the thermoplastic resin will be soft, causing a trouble in some cases.

In this case a thermoplastic resin composition containing a thermoplastic resin containing 0.01 to 20% by weight of unsaturated dicarboxylic acid or its anhydride as a third component besides the components (A) and (B) is used. The thermoplastic resin is usually used as an adhesive resin for EVOH or PA. The content of the unit derived from unsaturated dicarboxylic acid or its anhydride in the thermoplastic resin of the third component is preferably in a range of 0.01 to 20% by weight. Below 0.01% by weight the mechanical strength of the resin composition will be unsatisfactory, and the compatibility of EVOH or PA with the thermoplastic resin will be decreased, whereas above 20% by weight the reaction with EVOH or PA will excessively proceed, resulting in undesirable coloring or gel formation.

Preferable content of the unit derived from unsaturated dicarboxylic acid or its anhydride is in a range of 0.2 to 10% by weight. Unsaturated dicarboxylic anhydride includes, for example, maleic anhydride, itaconic anhydride, endic anhydric, citraconic anhydride, etc.

The thermoplastic resin as the third component may further contain a polymerizable monomer unit besides the unsaturated dicarboxylic acid or its anhydride. The polymerizable monomer includes ester compounds, acid compounds, ether compounds, hydrocarbon compounds, etc. each containing an unsaturated bond.

Besides the thermoplastic resin containing the unsaturated dicarboxylic acid or its anhydride, other thermoplastic resins such as polyolefins, e.g. PE, PA, copolymers of ethylene with α-olefin having 3 to 12 carbon atoms, etc.; polystyrene, polyethylene terephthalate; polyvinyl chloride, polycarbonate, etc. can be used as a fourth component thermoplastic resin.

The present thermoplastic resin composition can contain various additives and compounding agents, if required. Examples of additives and compounding agents include an antioxidant (heat stabilizer), an ultraviolet absorber (light stabilizer), an antistatic agent, an anti-mist agent, a flame retardant, a lubricating agent (slip agent and antiblocking agent), inorganic and organic fillers, a reinforcing agent, a coloring agent (dye and pigment), a foaming agent, a cross-linking agent, a perfume, etc.

Procedure for blending to prepare the present thermoplastic resin composition is not particularly limited, and it is preferable to conduct pelletizing, for example, by a ribbon blender, a higher speed mixer, a kneader, a pelletizer, mixing rolls, etc. and then dry the resulting pellets. The respective components of the present thermoplastic resin composition can be directly charged into a molding machine to conduct molding. Additives and compounding agents can be added to the component polymers of the resin composition in the production line for pelletization or to the resin composition when pelletized.

Multilayered laminate of the present invention will be described below:

The present multilayered laminate is a laminate, which comprises:

(A) at least one resin layer comprising an ethylenic copolymer containing ethylene units and at least one of acrylamide derivative units and methacrylamide derivative units, (B) a layer of other thermoplastic resin, and (C) a hygroscopic gas barrier layer as an intermediate layer, laid one upon another.

In the present multilayered laminate, component (A) is the same as component (A) in the present thermoplastic resin composition.

Content of the acrylamide derivative units and methacrylamide derivative units in the ethylenic copolymer is usually 0.1 to 50% by weight, preferably 1 to 45% by weight. Below 0.1% by weight, the effect on the prevention of gas barrier property from a decrease in the retort treatment will not be satisfactory, whereas above 50% by weight the copolymer will lose the flexibility and the rigidity will not be enough when made into multilayered laminates.

In the present multilayered laminate, a hygroscopic gas barrier layer (C) is used as an intermediate layer. For the hygroscopic gas barrier layer, at least one of saponification products of olefin-vinyl acetate copolymer, and PA is preferably used. The saponification products of olefin/vinyl acetate copolymer include, for example, EVOH, saponification products of propylene-vinyl acetate copolymer, etc. Particularly, EVOH is preferably used due to the ready polymerization. EVOH containing at least 15% by mole, preferably 15 to 60% by mole, of ethylene units and having a saponification degree of vinyl acetate component of at least 90% is preferable. When the content of ethylene units is below 15% by mole, the melt moldability will be unsatisfactory, whereas above 60% by mole the gas barrier property is deteriorated. When the saponification degree is less than 90%, the gas barrier property will be deteriorated. EVOH containing 25 to 50% by mole of ethylene units and having a saponification degree of at least 96% is particularly preferable.

Besides the ethylene units, vinyl acetate units and vinyl alcohol units formed by saponification of vinyl acetate, such unsaturated acids as acrylic acid, methacrylic acid, crotonic acid, maleic acid, etc., or their alkyl esters, or such α-olefins as propylene, butene, α-decene, α-octadecene, etc. may be contained as monomer units.

Examples of PA include polycondensation products of lactam, ε-amino acids, and dibasic acids and diamines, as mentioned before.

In the present multilayered laminate, a layer of other thermoplastic resin is provided as a layer (B). Examples of the other thermoplastic resin include polyolefins typical of e.g. PP and PE, polycarbonate, PA, etc. The polyolefins refers to medium and high density PE, PP, ethylene/propylene random copolymer, ethylene-propylene block copolymer, copolymers of ethylene with α-olefin having 3 to 12 carbon atoms. Examples of copolymers of ethylene with α-olefin having 3 to 12 carbon atoms include ethylene/butene-1 copolymer, ethylene/4-methylpentene-1 copolymer, ethylene/hexene-1 copolymer, modified PP prepared by blending ethylene/butene-1 copolymer with ethylene/propylene rubber, modified polybutene, modified ethylene/4-methylpentene, etc. Furthermore, the polyolefins include copolymers of the polyolefinic polymer grafted with an unsaturated carboxylic acid or its anhydride in the presence of an organic peroxide or copolymerized with other monomers (e.g. methyl methacrylate, ethyl acrylate, etc.).

From the viewpoint of a sterilizing means used for packaging of food, medicaments, etc. i.e. so called retort treatment, PP such as ethylene/propylene random copolymer, ethylene/propylene block copolymer, etc. and polyester are preferable among them. Furthermore, from the viewpoint of cost and feasibility, PP is particularly preferable.

In the layer structure of the present multilayered laminate it is necessary to provide at least one resin layer (A) comprising an ethylenic copolymer containing ethylene units and at least one of acrylamide derivative units and methacrylamide derivative units. Without the layer (A), the effect of the present invention is not be obtained. The layer (A) may be provided in close proximity to the hygroscopic gas barrier layer (C), or distant therefrom. When the layer (A) is provided in close proximity to the layer (C), and when the layer (C) has a good miscibility with the ethylenic copolymer, as EVOH or PA, only ethylenic copolymer is used as layer (A) and provided in direct contact with the layer (C).

When the layer (A) is provided distant from the layer (C) on the other hand, the ethylenic copolymer may be mixed into the adhesive resin layer in case of coextrusion molding. In that case, the peel strength to EVOH or PA is improved. The ethylenic copolymer may be also mixed into a layer containing scraps, etc.

In these cases, the content of the ethylenic copolymer is desirably in a range of 2 to 80% by weight. Below 2% by weight, the effect on capturing the water permeated therein during the retort treatment or boiling sterilization treatment will be reduced, whereas above 80% by weight the rigidity will be undesirably lowered. Preferable range is 5 to 70% by weight. When the layer (A) is provided at the outside of the layer (C), the effect of the present invention will be more remarkable.

The present multilayered laminate can be prepared generally by simultaneous extrusion molding of resins in a multilayered state of molten resin flows from a corresponding number of extruders to the number of the resins, i.e. by the so-called coextrusion molding (feed block, multimanifold).

The present multilayered laminate can be also prepared by coinjection molding, coextrusion pipe molding, dry laminate molding using a polyethyleneimine or titanate coupling agent or an adhesive for dry laminate such as isocyanate-acryl-based adhesive, etc. or sandwich lamination molding, or by other molding procedures such as coextrusion lamination molding.

The thus obtained multilayered laminate can be further subjected to reheating and stretching by a vacuum molding machine, a compressed air molding machine, a stretching blow molding machine, etc., or to heating and stretching by a uniaxial or biaxial stretching machine.

The present multilayered laminate can maintain the gas barrier property proper to the gas barrier layer without any deterioration of the gas barrier property, because it seems that the water permeated therein during the retort treatment, etc. is absorbed into the ethylenio copolymer of layer (A), which is composed of similar hydroscopic material, before the water is absorbed into the hygroscopic gas barrier layer (C) as an intermediate layer.

The present multilayered laminate has distinguished gas barrier property and mechanical strength and can well preserve the content, when formed in pouches, even if subjected to a retort treatment or boiling treatment.

PREFERRED EMBODIMENTS OF THE INVENTION

The present invention will be explained in detail below, referring to Examples and Comparative Examples, which will not be limitative of the present invention.

In the following Examples and Comparative Examples the following testing procedures were employed: MFR For PP, measurement was made under a load of 2.16 kg at 230° C. according to JIS-K7210, and, for PE, measurement was made under a load of 2.16 kg at 190° C. according to JIS-K6760.

Peel Strength Test

Laminate sample was cut at a width of 15 mm in the take-up direction to prepare test pieces, which were subjected to a state conditioning at 23° C. and a relative humidity of 50% for 24 hours and then peel strength was measured at an angle of 180° and a drawing speed of 300 mm/minute.

Izod Impact Strength (Notched)

Measurement was made according to ASTM-D256.

Flexural Modulus Test

Measurement was made according to ASTM-D790.

Half-life Test of Static Electricity

Measurement was made by Electrostatic Honest Meter, Type S5109 (100 V, 80 VA, 1550 rpm), made by Shishido Denki K.K., Japan.

Volume Resistibility Test

Measurement was made by electric resistance meter, Type 16008, made by Yokogawa-Hewlett-Packard, K.K., Japan.

Coatability Test

Measurement was made by cross-cut peeling test according to JIS-K5400.

Radiation Resistance Test

Test pieces were irradiated with γ-rays, 3 Mrad, from a cobalt-60 source, and tensile strength, elongation in tension and falling weight impact strength were measured right after the irradiation and after preservation at 50° C. for 30 days.

Tensile Strength Test

Measurement was made according to JIS-K6758.

Falling Weight Impact Test

Weight were made to fall onto test pieces from a definite height to measure an energy level (kg-cm) until the test pieces were broken.

Haze Test

Measurement was made by Haze meter, made by Toyo Seiki Seisakusho, K.K., Japan, according to ASTM-D1003.

Heat Seal Peel Strength Test

A film, 40 μm thick, was formed by a 40 mm-in-diameter cast film molding machine, and heat sealed at preset temperatures under head seal pressure of 1 kg/cm² for a heat seal time of 1.0 second by a heat sealing machine having a heat seal bar, 5 mm×200 mm, and test pieces, 15 mm wide, were prepared from the film. Type T peel strength was determined for every 10 test pieces at a drawing speed of 500 mm/minutes by rounding off the figure in the first place.

Oxygen Permeation Test

Measurement was made at a relative humidity of 65% and also of 90% by OXTRAN-10/50A, made by Modern Control Co. according to ASTM-D3985-81 (cc-30 μm/m²•day•atm).

Film Impact Strength Test

Test films were left standing at 23° C. and a relative humidity of 50% for 7 days to conduct state conditioning and subjected to measurement at 23° C. and a relative humidity of 50% by a pendulum-type, impact tester (1-inch hemisphere) made by Toyo Seiki Seisakusho, K.K., Japan.

Film Moldability Test

Melt molded state was observed and evaluation was made by the following marks:

Symbol ⊙: Good film state without any of formation of pores, gels, etc. of the film.

Symbol ○: Fair film state, though there is slight formation of fisheyes.

Symbol x: Poor film state with complete failure to conduct melt extrusion molding or with formation of pores.

Flexural Fatigue Resistance Test

Measurement was made by Geboflex tester with a cylinder diameter of 90 mm, a stroke of 178 mm, a twisting angle of 440°, a twisting stroke of 89 mm, a straight stroke of 63.5 mm, and a reciprocating rate of 40 runs/minute, made by Tester Sangyo K.K., Japan where flexing number fill generation of pin holes was determined by increasing the flexing number of Geboflex tester to 5, 10, 50, 100, 200 and then upwards by every increment of 100.

[Materials Employed]

(1) Ethylene copolymer (EAA)

| Abbreviation | Composition (Figures show % by weight) | |
|---|---|---|
| EA - 1 | E/DAA 19.2 | (MFR 3.5) |
| 2 | E/DAA 37 | (MFR 3.7) |
| 3 | E/AA 11.4 | (MFR 4.6) |
| 4 | E/DAA 9.1/MMA 6.2 | (MFR 5.1) |
| 5 | E/DAA 8.2/MAH 3.9 | (MFR 7.4) |
| 6 | E/DAA 24.1/MAH 3.1/VAC 3.4 | (MFR 4.4) |
| 7 | E/DAA 27.0/VAC 6.0 | |
| 8 | E/DAA 20.0/MMA 10.0 | |
| 9 | E/DAA 18.6/MMA 9.6 | (MFR 11.6) |
| 10 | E/DAA 24.1/VAC 3.4 | (MFR 4.4) |
| 11 | E/DAA 28.2/VAC 7.8 | (MFR 5.2) |

MFR (g/10 minutes) was determined at 190° C. under a load of 2.16 kg according to JIS K 6760.

E: Ethylene

DAA: N,N-dimethyl acrylamide

AA: Acrylamide

MMA: Methyl methacrylate

MAH: Maleic anhydride

VAC: Vinyl acetate (2) Ethylene/unsaturated dicarboxylic anhydride copolymer (EAN)

| EN - 1 | E/MMA 7.6/MAH 2.8 | (MFR 8.3) |
|---|---|---|
| 2 | E/EA 6.5/MAH 3.5 | (MFR 6.8) |
| 3 | E/IAH 4.9 | (MFR 8.2) |
| 4 | E/MAH 4.6 | (MFR 8.4) |
| | EA: Ethyl acrylate | |
| | IAH: Itaconic anhydride | |

(3) Modified polyolefin

| MP - 1 | LDPE/MAH Graft 0.5 | (MFR 5) |
| --- | --- | --- |
| 2 | Random PP/MAH Graft 0.9 | (MFR 55) |
| 3 | Homo PP/MAH Graft 0.7 | (MFR 72) |
| 4 | EPR E70/MAH Graft 1.6 | (MFR 5.8) |

(4) Other resins

| PP - 1 | LDPE | (p = 0.923, MFR 3.5) |
| --- | --- | --- |
| 2 | Random PP | (MFR 8.4, E 3.2) |
| 3 | Homo PP | (MFR 8.1) |
| 4 | Homo PP | (MFR 0.5) |
| 5 | Nucleating agent-added random PP (0.35 wt. % dibenzylidene-sorbitol added) | (MFR 20.1, E 7.1) |

(5) Rubbery substances

| EP - 1 | EPR E70 (Ethylene/propylene copolymer; ethylene content: 70 wt. %) |
| --- | --- |
| 2 | EBR E72 (Ethylene/butene-1 copolymer; ethylene content: 72 wt. %) |

(6) Polyvinyl alcohol (PVA)

| PV - 1 | Degree of saponification | 88%, |
| --- | --- | --- |
| | Degree of polymerization | 300 |
| 2 | Degree of saponification | 99.3%, |
| | Degree of polymerization | 500 |
| 3 | Degree of saponification | 88.5%, |
| | Degree of polymerization | 2400 |

(7) Polyamide (PA)

| PA - 1 | Nylon 6 | (made by Ube Kosan K.K., Japan 1022B (mp 196° C.) |
| --- | --- | --- |
| 2 | Nylon 6 | (made by Mitsubishi Kasei Kogyo K.K., Japan) 1010J |
| 3 | Nylon 6.6 | (made by Rhone-Poulenc, France) 140AP |

(8) Saponified product of ethylene/vinyl acetate copolymer (EVOH)

| EV - 1 | Soanol D | (made by Nihon Gosei Kagaku K.K., Japan (E 29 moles) |
| --- | --- | --- |
| 2 | Soanol A | (made by Nihon Gosei Kagaku K.K., Japan (E 44 moles) |
| 3 | Soanol DT | (made by Nihon Gosei Kagaku K.K., Japan (E 29 moles) |
| 4 | Eval EP-F101 | (made by Kuraray K.K., Japan) (E 32 moles) |

(9) Adhesive resin

| ER - 1 | ER-321P (made by Showa-Denko K.K., Japan) |
| --- | --- |

PREPARATION EXAMPLE 1
Preparation of Ethylenic Copolymer

Polymerization was carried out in an autoclave-type reactor of 4-1 net capacity with two separated zones at a temperature of 190° to 230° C. under pressure of 1,800 to 1,950 atmospheres, using t-butylperoxypivalate. N,N-dimethyl acrylamide and acrylamide as acrylamide components, and at least one of other monomers and solvent were injected into the upstream to the second stage compressor, and charged into the first zone of the reactor together with ethylene. The resulting copolymer was separated from the unreacted monomers in a high pressure separator and a low pressure separator, and pelletized through an extruder. In this manner, copolymers having different ethylene contents and MFRs were prepared. Contents of acrylamide derivatives in the respective copolymers were determined by an infrared spectrometer and $^{13}$C-NMR.

PREPARATION EXAMPLE 2
Preparation of Ethylene/Unsaturated Dicarboxylic Anhydride Copolymer Polymerization was carried out in an autoclave-type reactor of 4-1 net capacity with two separated zone at a temperature of 190° to 230° C. under pressure of 1,800 to 1,950 atmospheres, using t-butyl peroxypivolate. Unsaturated dicarboxylic anhydride or unsaturated dicarboxylic anhydride and at least one of other monomers and a solvent were injected into the upstream to the second stage compressor and charged into the first zone of the reactor together with ethylene. The resulting copolymer was separated from the unreacted monomers in a high pressure separator and a low pressure separator and pelletized through an extruder.

PREPARATION EXAMPLE 3

(1) Modified PE (MP-1)

Low density polyethylene was molten and graft modified with maleic anhydride through twin screw extruder and then washed with acetone to completely remove the unreacted matters. MFR: 5 (g/10 minutes); density: 0.915; maleic anhydride content: 0.5 wt.%

(2) Modified PP (MP-2)

Ethylene/propylene random copolymer having an ethylene content of 4.5 wt.% was molten and graft modified with maleic anhydride through a twin screw extruder and then washed with acetone to completely remove the unreacted matters. MFR: 55 (g/10 minutes); maleic anhydride content: 0.9 wt.%

(3) Modified Homo PP (MP-3)

Homopropylene resin was graft modified with maleic anhydride. MFR: 72 (g/10 minutes); maleic anhydride content: 0.7 wt.%

(4) Modified Ethylene/Propylene Elastomer (MP-4)

Ethylene/propylene elastomer was graft modified with maleic anhydride. Maleic anhydride content: 1.6 wt.%

EXAMPLE 1—1

20 parts by weight of ethylenic copolymer (EA-1) and 80 parts by weight of low density polyethylene (PO-1) were dry blended in a tumbler, and then extruded into a strand form through an extruder, 40 mm in diameter and L/D=28 at 190° C., then cooled with water, pelletized and melt mixed to prepare a resin composition.

The thus obtained resin composition, EVOH containing 29% by mole of ethylene component, Soanol DT (trademark of a product made by Nihon Gosei Kagaku K.K., Japan) and low density polyethylene, which will be hereinafter referred to as LDPE, having MFR of 3.0 (g/10 minutes) were extruded into a multilayered film of three members in three layers through a co-extrusion machine at a die temperature of 220° C. The extrusion and extrusion conditions employed are as follows:

The co-extrusion machine had a feed block of three-kinds in three layers, consisting of two extruders, each 40 mm in diameter and an extruder, 45 mm in diameter, and had a die with of 300 mm wide. Thickness of each layer was set to LDPE/resin composition/EVOH=30 µm/20 µm/20 µm. Take-up speed was 30 m/minute. Peel strength of the resin composition was measured, and the results are shown in Table 1.

EXAMPLES 1-2 to 1-18 and COMPARATIVE EXAMPLES 1—1 to 1-6

Components shown in Table 1 were used and multilayered films were prepared in the same manner as in Example 1—1. Peel strength of the respective resin compositions was measured, and the results are shown in Table 1.

EXAMPLES 1-19 to 1-28 and COMPARATIVE EXAMPLES 1-7 to 1-9

Resin compositions shown in Table 2 were prepared in the same manner as in Example 1—1 except that random PP (PO-2) was used for PO-1 and modified PP (MP-2) for modified PE (MP-1) in Example 1—1. Flat films of three-kinds in three layers, consisting of ethylene/propylene random copolymer resin containing 3.5% by weight of ethylene and having MFR 8.2 (g/10 minutes) at 230° C., the resin composition and EVOH were prepared. Peel strength of the resin compositions was measured, and the results are shown in Table 2.

EXAMPLES 1-29 to 1-31 and COMPARATIVE EXAMPLES 1-10 to 1-11

Multilayered films of three-kinds in three layers were prepared from resin compositions shown in Table 3 in the same manner as in Example 1—1 except that nylon-6 (1022B, trademark of a product made by Ube Kosan K.K., Japan) having a specific gravity of 1.14 was used for EVOH, and peel strength of the respective resin compositions was measured. The results are shown in Table 3. In Example 1-29 and Comparative Example 1-10, such a structure as ethylene/propylene random copolymer/the resin composition/nylon was used.

EXAMPLES 1-32 to 1-35 and COMPARATIVE EXAMPLES 1-12 to 1-15

Resin composition of Example 1—1 was coated onto various substrates shown in Table 4 by an extruder, 50 mm in diameter and a laminate machine, 400 mm in die width to a thickness of 20 µm at a cooling roll temperature of 25° C., a take-up speed of 120 m/minute, and a resin temperature of 260° C. and thereafter subjected to treatments in the same manner as in Example 1—1. Results of peel strength measurement are shown in Table 4, where substrate symbols employed are as follows:

Al: aluminum
OPP: biaxially stretched polypropylene
PET: polyethylene terephthalate
ONY: biaxially stretched nylon As is obvious from the foregoing Examples and Comparative Examples, the present resin compositions can considerably improve the adhesiveness. From the present resin compositions multilayered laminates having better adhesiveness than that of the conventional multilayered laminates can be prepared. The present multilayered laminates are applicable in a wide range of uses in food pouches, medicament packages, laminate steel plates, structural materials, etc. due to the distinguished peel strength.

EXAMPLES 2-1 to 2-15 and COMPARATIVE EXAMPLES 2-1 to 2-3

Resin compositions were prepared by melt mixing ethylenic copolymer and PP (PO-2, 3 and 5) shown in Table 5 at 230° C. by a vent-type twin screw extruder, type KTX-37, made by Kobe Seiko K.K., Japan. The thus obtained resin compositions were prepared into test pieces for determining izod impact strength and flexural modulus by Minimat ⅛-ounce injection molding machine, made by Sumitomo Juko K.K., Japan at an injection temperature of 230° C. and a mold temperature of 45° C. The test pieces were left standing in a thermo-hygroset room at 23° C. and a relative humidity of 50% for 7 days for state conditioning, and then subjected to determination of Izod impact strength (notched) and flexural modulus at 23° C. and a relative humidity of 50%. The results are shown in Table 5.

In Examples 2—2, 2-5, 2-8 2-9, 2-12 and 2-14 and Comparative Examples 2-1 to 2-3, the resin compositions were molded not flat plates, 10 cm×12 cm and 2 mm in thickness by a 10-ounce injection molding machine, made by Nisei Jushi Kogyo K.K., Japan at an injection temperature of 230° C. and a mold temperature of 45° C. The molded flat plates were subjected to determination of volume resistivity on one hand, and the same flat plates were sprayed with Flexen 101, a product made by Nihon Paint K.K., Japan to conduct a coatability test. The results are shown in Table 5. To observe stress whitening, the flat plates were flexed, and it was found that no whitening phenomena were observed on all the flat plates of Examples, but the flat plates of Comparative Examples were readily whitened.

0.05% by weight of tetrakis [methylene (3.5-di-t-butyl-hydroxyphenyl)propionate] methane, 0.05% by weight of calcium stearate and 0.35% by weight of dibenzylidene-sorbital were added to each of the resin compositions with the mixing ratios given in Table 5, and thoroughly mixed therewith. After the mixing, each of the resulting mixtures was extruded through a twin screw extruder, 40 mm in diameter, at 230° C. and pelletized. The pellets were molded into flat plates, 10 cm×12 cm and 2 mm thickness, through the same injection molding machine under the same molding conditions as above. The resulting flat plates were irradiated with γ-rays from the cobalt-60 source to evaluate irradiation resistance of the flat plates. At the same time, heat seal peel strength and HAZE were measured. The results are shown in Table 6.

As is apparent from the foregoing Examples and Comparative Examples, the present thermoplastic resin compositions can give moldings having distinguished characteristics such as distinguished flexibility, impact strength, transparency, low temperature heat sealability, antistatic property, coatability, radiation resistance, etc. Thus, it is expected that the present thermoplastic resin compositions are effectively utilized as various industrial materials, industrial packaging materials, food packing material, medical instrument materials, medicament packaging materials, cosmetic packaging material and polyvinyl chloride substitute materials.

EXAMPLES 3-1 to 3-14 and COMPARATIVE EXAMPLES 3-1 to 3-6

Ethylenic copolymers EAA (EA-1 to EA-4), PVA (PV-1 to PV-3) and other thermoplastic resins, i.e. polyolefin (PO-1 or PO-3) shown in Table 7 were melt mixed through a vent-type twin screw extruder, Type KTX-37, made by Kobe Seiko K.K., Japan, at 220° C. to obtain thermoplastic resin compositions shown in Table 7. The thus obtained compositions were casted into films and tested for oxygen permeability, film processability and film impact strength, and the results are given in Table 7.

As is apparent from the foregoing Examples and Comparative Examples, the present thermoplastic resin compositions are distinguished in melt processability and can give moldings having much distinguished gas barrier property, mechanical strength, etc., and are effective as food packing materials, medicament packaging materials, cosmetic packaging materials or containers required for a good gas barrier property.

EXAMPLES 4-1 to 4-11 and COMPARATIVE EXAMPLES 4-1 to 4-3

Ethylenic copolymer EAA (EA-1 to EA-5), nylon-6 PP (PA-1), and low density polyethylene (PO-1) were melt mixed in mixing ratios given in Table 8 through a vent-type twin screw extruder, Type KTX-37, made by Kobe Seiko K.K. at 230° C. to prepare thermoplastic resin compositions. Then, the thus obtained resin compositions were each casted into films, 30 μm thick, through a cast film molding machine, 40 mm in diameter. The films were tested for oxygen permeability, and then left standing in a thermo hygroset room at 230° C. and a relative humidity of 50% for 7 days for state conditioning, and tested for film impact strength at 23° C. and a relative humidity of 50%. The results are shown in Table 8.

EXAMPLES 4-12 to 4-19 and COMPARATIVE EXAMPLES 4-5 to 4-10

Ethylenic copolymer EAA, nylon-6 (PA-2) or nylon-6,6 (PA-3), low density polyethylene (PO-1) or homo PP resin (PO-3), or modified PP (MP-3) or graft-modified ethylene/ propylene elastomer (MP-4) were melt mixed in mixing ratios shown in Table 9 through a vent-type twin screw extruder, Type KTX-37, made by Kobe Seiko K.K., Japan, at 230° C. for the nylon-6 mixtures or at 280° C. for the nylon-6,6 mixtures to prepare thermoplastic resin compositions. Then, the thus prepared resin compositions were molded into test pieces for measuring Izod impact strength and flexural modulus through a Minimat ⅛-ounce injection molding machine, made by Sumitomo Juko K.K., Japan at an injection temperature of 270° C. and a mold temperature of 45° C. Then, the test pieces were left standing in a thermo hygroset room at 23° C. and a relative humidity of 50% for 7 days for state conditioning and then tested for Izod impact strength (notched) and flexural modulus at 23° C. and a relative humidity of 50%. The Izod impact strength test was conducted at 23° C. and also at −30° C. The results are shown in Table 9.

As is apparent from the foregoing Examples and Comparative Examples the present thermoplastic resin compositions are distinguished in the uniform bendability and melt processability and can produce moldings having distinguished gas barrier property, balance between the impact strength and the rigidity and mechanical strength, and thus it is expected that the present thermoplastic resin compositions are effectively utilized, for example, as food packaging materials, medicament packaging materials, cosmetic packaging materials, or molding materials for containers, etc. required for a good gas barrier property.

EXAMPLES 5-1 to 5-12 and COMPARATIVE EXAMPLES 5-1 to 5-3

Ethylenic copolymer EAA and EVOH, i.e. Soanol D, trademark of a product made by Nihon Gosei Kagaku K.K., Japan (EV-1) or Soanol A, trademark of a product made by Nihon Gosei Kagaku K.K., Japan (EV-2) were melt mixed in mixing ratio shown in Table 10 through a vent-type twin screw extruder, Type KTX-37, made by Kobe Seiko K.K., Japan, at 220° C. to obtain thermoplastic resin compositions shown in Table 10.

The thus obtained resin compositions were vacuum dried at 60° C. for 24 hours and casted into films, 30 μm thickness, through a cast film molding machine, made by Yoshii Tekko K.K., Japan, at 220° C. The films were tested for oxygen permeability and film impact strength, and the results are shown in Table 10.

The films of Examples 5-1 to 5—5 and Comparative Example 5-1 were also tested for flexural fatigue resistance, and the results are also shown in Table 10.

The resin compositions of Examples 5-1 to 5-3 and Comparative Example 5-1 were molded into test pieces for measuring Izod impact strength and flexural modulus through a Minimat ⅛-ounce injection molding machine, made by Sumitomo Juko K.K., Japan, at an injection temperature of 230° C. and a mold temperature of 45° C. The test pieces were left standing in a thermo hygroset room at 23° C. and a relative humidity of 50% for 7 days for state conditioning and tested for Izod impact strength (notched) and flexural modulus at 23° C. and a relative humidity of 50%. The results are shown in Table 10.

The resin compositions of Examples 5-4 and 5—5 were molded in test pieces in the same manner as above and the test pieces were likewise tested for izod impact strength (notched). It was found that the test pieces were not broken at all. The results are also shown in Table 10.

EXAMPLES 5-13 to 5-18 and COMPARATIVE EXAMPLES 5-2 to 5-3

The respective components as shown in Table 1 were melt mixed and pelletized in mixing ratios shown in Table 10 through a vent-type twin screw extruder, Type KTX-37, made by Kobe Seiko K.K., Japan, at 220° C. to obtain thermoplastic resin compositions shown in Table 10.

The thus obtained resin compositions were vacuum dried at 60° C. for 24 hours and then casted into films, 30 μm thickness, through a cast film unit, made by Yoshii Tekko K.K., Japan, at 230° C., and the films were tested for oxygen permeability and film impact strength. The results are shown in Table 10.

EXAMPLES 5-19 to 5-21

Ethylenic copolymer EAA, EVOH, i.e. Soanol D (EV-1), and low density polyethylene (PO-1) as other thermoplastic resin were melt mixed in mixing ratios shown in mixing ratios shown in Table 10 through a vent-type twin screw extruder, Type KTX-37, made by Kobe Seiko K.K., Japan, at 220° C. to prepare thermoplastic resin compositions shown in Table 10.

The thus prepared resin compositions were vacuum dried at 60° C. for 24 hours and casted into films, 30 μm thickness, through a cast film unit, made by Yoshii Tekko K K , Japan, at 220° C. and the film were tested for oxygen permeability and film impact strength. The results are shown also in Table 10.

The present thermoplastic resin compositions can give moldings having distinguished flexibility, impact strength and gas barrier property, as compared with the conventional saponification products of olefin-vinyl acetate copolymers, and thus are effective as food packaging materials, medicament packaging materials, cosmetic packaging materials, or compositions applicable to containers, etc. required for a good gas barrier property.

EXAMPLES 6-1 to 6-12 and COMPARATIVE EXAMPLES 6-1 to 6—6

In Example 6-1, 81 parts by weight of homo PP (PO-3), 4.5 parts by weight of modified PP (MP-2), 9.5 parts by weight of EVOH (EV-4), i.e. Eval EP-F101 (EV-4), trademark of a product made by Kurarey K.K., Japan, and 5 parts by weight of ethylenic copolymer EAA (EA-1) were mixed in a tumbler, pelletized through a twin screw extruder, and then vacuum dried at 60° for 24 hours. Then, the pellets were charged into an extruder with a full-flight screw, L/D=26 and compression ratio=3, and molded into a sheet through a flat die, 250 mm wide, at a casting temperature of 170° to 230° C. and a die temperature of 230° C. The sheet, 300 µm thickness, was wound onto a take-up roll continuously for 6 hours. The thus obtained sheet was uniform and a good compatibility, and no foreign matters of phase separation due to poor compatibility was observed.

In Comparative Example 6-1, 85 parts by weight of homo PP (PO-3), 10 parts by weight of EVOH (EV-4) and 5 parts by weight of modified PP (MP-2) were mixed without EAA (EA-1) of Example 6-1, and a sheet was prepared from the resulting resin composition in the same manner as in Example 6-1. Right after the sheeting of the sheet, many foreign matters of uneven phase separation, not observed in Example 6-1, were found, and at the same time, dark brown molten resin was deposited and accumulated on the die lip increasingly with time. The appearance of the thus obtained sheet was quite poor due to the phase separation of EVOH, which was detected and confirmed by dipping the sheet in an ethanol solution containing 5% Methyl Red as a water-soluble dye.

In Examples 6-1 to 6-12 and Comparative Examples 6-2 to 6—6, species of homo PP, EVOH, modified PP and EAA and their mixing ratios were changed from those of Example 6-1, as shown in Table 11, and sheeting was carried out in the same manner as in Example 6-1. Deposition state of the molten resin on the die lip during the molding and the film state of the resulting sheets were inspected. The results are shown in Table 11. Evaluation of the state of the sheets was made according to the following standard:

A: Uniform and good compatibility without foreign matters of phase separation. No substantial deposition and accumulation of dark brown molten resins on the die lip during the sheeting.

B: Uniform and good compatibility without foreign matter of phase separation. Some deposition and accumulation of dark brown molten resins on the die lip during the sheeting.

C: Good compatibility partly with foreign matters of phase separation. A little more deposition and accumulation of dark brown molten resins on the die lip during the sheeting.

D: Very poor compatibility with much foreign matters of phase separation. Much deposition and accumulation of dark brown molten resins on the die lip during the sheeting.

The resin compositions of Examples 6-2, 6-3, 6-5, 6-7, 6-10 and 6-11, and Comparative Examples 6-2 to 6—6 were molded each into test pieces for measuring izod impact test and flexural modulus test through a Minimat ⅛-ounce, injection molding machine, made by Sumitomo Juko K.K., Japan, at an injection temperature of 230° C. and a mold temperature of 45° C. Then, the test pieces were left standing in a thermo hygroset room at 23° C. and a relative humidity of 50% for 7 days for state conditioning and then tested for Izod impact strength (notched) and flexural modulus under the same conditions as above. The results are shown in Table 11.

As is apparent from the foregoing Examples and Comparative Examples, the present thermoplastic resin compositions have a much improved compatibility between EVOH, the resin containing PA and unsaturated dicarboxylic acid or its anhydride, and other thermoplastic resin, and have particularly remarkable effects, such as a high peel strength, etc. when employed as one layer in a multilayered laminate.

EXAMPLE 7-1

EVOH Soal A (trademark of a product made by Nihon Gosei K.K., Japan) (EV-2) as a hygroscopic gas barrier resin, an adhesive resin ER321P (trademark of a product made by Showa Denko K.K., Japan) (ER-1), polypropylene Shoallomer SA510 (trademark of a product made by Showa Denko K.K., Japan) as a resin for forming a surface layer, and EAA (EA-2) were molded into a multilayered laminate sheet through a feed block type, multilayered sheeting machine at a die temperature of 220° C., and the resulting multilayered laminate sheet was prepared into containers having a capacity of 100 cc through a vacuum molding machine at a draw ratio of 0.5. The thus obtained containers were subjected to a retort treatment at 125° C. for 30 minutes. Every three containers were tested for oxygen gas barrier property at 23° C. and a relative humidity of 65% before and after the retort treatment by OXTRAN-10/50 A, made by Modern Control Co. to obtain average oxygen permeabilities before and after the retort treatment.

Laminate structure and each layer thickness of the containers are given below, where PP stands for polypropylene, AD for the adhesive resin, EV for EVOH and B for EAA, and as to the PP layers, PP at the outer side of the container is indicated by "Outer" and that at the inner side by "Inner":

Inner PP/AD/B/AD/EV/AD/B/AD/outer PP=425/10/20/10/30/10/20/10/425 µm each in thickness Oxygen permeabilities before and after the retort treatment are shown in Table 12,

COMPARATIVE EXAMPLES 7-1

A multilayered laminate sheet having a laminate structure and each layer thickness was prepared and tested in the same manner as in Example 7-1 except that no B layer was provided and laminate structure and each layer thickness in inner PP/AD/EV/AD/outer PP=455/10/30/10/455 µm in Example 7-1. The test results are shown in Table 12.

EXAMPLES 7-2 to 7-5

Multilayered laminate sheets were prepared and tested in the same manner as in Example 7-1, except that EV-3 was used as hygroscopic gas barrier resin and ethylenic copolymer as B layer shown in Table 12 were used in Example 7-1. The test results are shown in Table 12.

EXAMPLES 7-6 to 7-11 and COMPARATIVE EXAMPLES 7-2 and 7-3

Adhesive resin ER321P (ER-1) and ethylenic copolymer EAA shown in Table 11 were pelletized in mixing ratios shown in Table 12 through a twin screw extruder, 40 mm in thickness, at 220° C. to prepare thermoplastic resin compositions. The thus prepared resin compositions was used as an adhesive resin (which will be hereinafter referred as B (AD) to prepare multilayered laminate sheets having the following laminate structure and each layer thickness in the same manner as in Example 7-1, and the laminates were tested in the same manner as in Example 7-1. The results are shown in Table 12.

Inner PP/B(AD)/EV/B(AD)/Outer PP=425/20/30/20/425 μm each in thickness

As is apparent from the foregoing Examples and Comparative Examples, the present multilayered laminates have distinguished gas barrier property, mechanical strength and good preservability of contents when formed in a package form and can be prepared at a low cost without any special extruder. That is, the present multilayered laminates can be suitably applied to package films for food packages and medicament packages or containers.

TABLE 1

| | Components for resin composition | | | | | | | | | | |
|---|---|---|---|---|---|---|---|---|---|---|---|
| | EAA | | Other resin | | Rubbery substance | | EAN | | Modified polyolefin | | |
| | Species | Amount (parts by weight) | Species | Amount (parts by weight) | Species | Amount (parts by weight) | Species | Amount (parts by weight) | Species | Amount (parts by weight) | Peel strength (g/15 mm width) |
| Example 1-1 | EA-1 | 20 | PO-1 | 80 | — | — | — | — | — | — | 950 |
| 2 | 2 | 10 | PO-1 | 90 | — | — | — | — | — | — | 890 |
| 3 | 2 | 30 | PO-1 | 70 | — | — | — | — | — | — | 1500 or more |
| 4 | 3 | 25 | PO-1 | 70 | — | — | — | — | — | — | 920 |
| 5 | 4 | 40 | PO-1 | 60 | — | — | — | — | — | — | 1500 or more |
| 6 | 3 | 10 | PO-1 | 90 | — | — | — | — | — | — | 760 |
| 7 | 6 | 15 | PO-1 | 85 | — | — | — | — | — | — | 940 |
| 8 | 6 | 35 | PO-1 | 50 | EP-1 | 15 | — | — | — | — | 1500 or more |
| 9 | 2 | 15 | PO-1 | 55 | EP-2 | 30 | — | — | — | — | 1290 |
| 10 | 1 | 80 | — | — | — | — | — | — | MP-1 | 20 | 1500 or more |
| 11 | 4 | 50 | — | — | — | — | — | — | MP-1 | 50 | 1210 |
| 12 | 2 | 10 | — | — | — | — | — | — | MP-1 | 90 | 1040 |
| 13 | 1 | 10 | — | — | — | — | EN-1 | 90 | — | — | 620 |
| 14 | 1 | 10 | PO-1 | 60 | EP-1 | 15 | — | — | MP-1 | 15 | 820 |
| 15 | 2 | 15 | PO-1 | 65 | — | — | — | — | MP-1 | 20 | 1190 |
| 16 | 2 | 10 | PO-1 | 60 | EP-2 | 10 | — | — | MP-1 | 20 | 1210 |
| 17 | 1 | 10 | PO-1 | 65 | EP-1 | 15 | EN-1 | 10 | — | — | 640 |
| 18 | 1 | 15 | PO-1 | 60 | EP-1 | 15 | EN-4 | 10 | — | — | 690 |
| Comp.Ex. 1-1 | — | — | PO-1 | 65 | EP-1 | 15 | — | — | MP-1 | 20 | 310 |
| 2 | — | — | PO-1 | 55 | EP-1 | 10 | — | — | MP-1 | 35 | 350 |
| 3 | — | — | — | — | — | — | EN-1 | 100 | — | — | 120 |
| 4 | — | — | — | — | — | — | EN-4 | 100 | — | — | 110 |
| 5 | — | — | — | — | EP-1 | 20 | EN-1 | 80 | — | — | 180 |
| 6 | — | — | — | — | EP-2 | 30 | EN-4 | 70 | — | — | 210 |

TABLE 2

| | Components for resin composition | | | | | | | | | | |
|---|---|---|---|---|---|---|---|---|---|---|---|
| | EAA | | Other resin | | Rubbery substance | | EAN | | Modified polyolefin | | |
| | Species | Amount (parts by weight) | Species | Amount (parts by weight) | Species | Amount (parts by weight) | Species | Amount (parts by weight) | Species | Amount (parts by weight) | Peel strength (g/15 mm width) |
| Example 1-19 | EA-1 | 10 | PO-2 | 65 | EP-1 | 25 | — | — | — | — | 1180 |
| 20 | 3 | 15 | PO-2 | 75 | EP-2 | 10 | — | — | — | — | 920 |
| 21 | 6 | 10 | PO-2 | 80 | EP-1 | 10 | — | — | — | — | 960 |
| 22 | 2 | 20 | PO-2 | 80 | — | — | — | — | — | — | 810 |
| 23 | 6 | 30 | PO-2 | 70 | — | — | — | — | — | — | 790 |
| 24 | 3 | 40 | PO-2 | 60 | — | — | — | — | — | — | 680 |
| 25 | 2 | 70 | — | — | — | — | — | — | MP-2 | 30 | 1500 or more |
| 26 | 1 | 10 | PO-2 | 60 | EP-1 | 15 | — | — | MP-2 | 15 | 820 |
| 27 | 3 | 30 | PO-2 | 50 | — | — | — | — | MP-2 | 20 | 940 |
| 28 | 5 | 25 | PO-2 | 45 | EP-1 | 10 | — | — | MP-2 | 20 | 910 |
| Comp. Ex. 1-7 | — | — | PO-2 | 50 | EP-1 | 25 | — | — | MP-2 | 25 | 280 |
| 8 | — | — | PO-2 | 35 | EP-1 | 25 | — | — | MP-2 | 40 | 320 |
| 9 | — | — | — | — | — | — | EN-1 | 100 | — | — | 180 |

TABLE 3

| | Components for resin composition | | | | | | | | | |
|---|---|---|---|---|---|---|---|---|---|---|
| | EAA | | Other resin | | Rubbery substance | | EAN | | Modified polyolefin | | |
| | Species | Amount (parts by weight) | Species | Amount (parts by weight) | Species | Amount (parts by weight) | Species | Amount (parts by weight) | Species | Amount (parts by weight) | Peel strength (g/15 mm width) |
| Example 1-29 | EA-2 | 20 | PO-1 | 60 | EP-1 | 20 | — | — | — | — | 1500 or more |
| 30 | 3 | 15 | — | 85 | — | — | — | — | — | — | 1130 |
| 31 | 3 | 10 | PO-2 | 44 | EP-2 | 23 | — | — | MP-2 | 23 | 1320 |
| Comp. Ex. 1-10 | — | — | — | — | — | — | EN-1 | 100 | — | — | 280 |
| 11 | — | — | PO-1 | 50 | EP-1 | 25 | — | — | MP-1 | 25 | 120 |

TABLE 4

| | Substrate species | Peel strength (g/15 mm width) |
|---|---|---|
| Example 1-32 | Al | 840 |
| 33 | OPP | 610 |
| 34 | PET | 520 |
| 35 | ONY | 710 |
| Comp. Ex. 1-12 | Al | 120 |
| 13 | PET | 20 |
| 14 | OPP | 320 |
| 15 | ONY | 340 |

TABLE 5

| | Components for resin composition | | | | Izod Impact strength (notched) (kg - cm/cm) | Flexural modulus (kg/cm³) | Half-life of antistaticbility (min.) | Volume resistibility (Ω - cm) | Miscibility evaluation (Marks) |
|---|---|---|---|---|---|---|---|---|---|
| | EAA | | PP | | | | | | |
| | Species | Amount (parts by weight) | Species | Amount (parts by weight) | | | | | |
| Example 2-1 | EA-1 | 5 | PO-3 | 95 | 3.1 | 12,500 | — | — | — |
| 2 | EA-1 | 10 | PO-3 | 90 | 3.9 | 11,700 | 6.8 | $8.6 \times 10^{14}$ | 10 |
| 3 | EA-2 | 5 | PO-3 | 95 | 3.7 | 12,100 | — | — | — |
| 4 | EA-2 | 10 | PO-3 | 90 | 4.7 | 11,300 | — | — | — |
| 5 | EA-2 | 50 | PO-3 | 50 | N.B* | 6,500 | 2.5 | $1.2 \times 10^{14}$ | 10 |
| 6 | EA-2 | 65 | PO-3 | 35 | N.B | 4,800 | — | — | — |
| 7 | EA-3 | 10 | PO-3 | 90 | 3.1 | 12,100 | — | — | — |
| 8 | EA-4 | 5 | PO-3 | 95 | 3.5 | 13,000 | 12.5 | $6.2 \times 10^{15}$ | 6 |
| 9 | EA-4 | 10 | PO-3 | 90 | 4.5 | 12,500 | 8.5 | $6.6 \times 10^{14}$ | 8 |
| 10 | EA-4 | 20 | PO-3 | 80 | 6.2 | 11,600 | — | — | — |
| 11 | EA-5 | 10 | PO-3 | 90 | 3.4 | 12,800 | — | — | — |
| 12 | EA-2 | 10 | PO-2 | 90 | 6.4 | 10,800 | 6.1 | $7 \times 10^{14}$ | 10 |
| 13 | EA-2 | 50 | PO-2 | 50 | N.B | 4,400 | — | — | — |
| 14 | EA-2 | 10 | PO-5 | 90 | N.B | 4,200 | 6.4 | $8.2 \times 10^{14}$ | 10 |
| 15 | EA-4 | 20 | PO-5 | 80 | N.B | 3,900 | — | — | — |
| Comp. Ex. 2-1 | — | — | PO-3 | 100 | 1.4 | 13,600 | ∞ | $1.2 \times 10^{16}$ | 0 |
| 2 | — | — | PO-2 | 100 | 3.0 | 8,800 | ∞ | $2.5 \times 10^{16}$ | 0 |
| 3 | — | — | PO-5 | 100 | 10.1 | 5,100 | ∞ | $2.1 \times 10^{16}$ | 0 |

TABLE 6

| | Without γ-ray radiation | | | Right after 3M rad radiation | | |
|---|---|---|---|---|---|---|
| | Tensile strength (kg/cm²) | Elongation in tension (%) | Falling weight impact strength (kg – cm) | Tensile strength (kg/cm²) | Elongation in tension (%) | Falling weight impact strength (kg – cm) |
| Example 2-1 | — | — | — | — | — | — |
| 2 | 352 | 820 | 85 | 341 | 660 | 60 |
| 3 | — | — | — | — | — | — |
| 4 | — | — | — | — | — | — |
| 5 | 172 | 780 | 195 | 167 | 790 | 184 |
| 6 | — | — | — | — | — | — |
| 7 | — | — | — | — | — | — |
| 8 | 346 | 810 | 65 | 322 | 540 | 48 |
| 9 | 332 | 790 | 90 | 329 | 570 | 56 |
| 10 | — | — | — | — | — | — |
| 11 | — | — | — | — | — | — |
| 12 | 282 | 590 | 175 | 275 | 490 | 141 |
| 13 | — | — | — | — | — | — |
| 14 | 328 | 810 | 143 | 281 | 640 | 109 |
| 15 | — | — | — | — | — | — |
| Comp. Ex. 2-1 | 383 | 630 | 35 | 310 | <25 | <5 |
| 2 | 308 | 540 | 150 | 270 | <25 | <10 |
| 3 | 269 | 490 | 180 | 220 | 80 | 38 |

| After 3 or rad radiation and preservation at 50° C. for 30 days | | | Heat seal peel strength (g/15 mm width) Heat seal temp. (°C.) | | | HAZE (%) |
|---|---|---|---|---|---|---|
| Tensile strength (kg/cm²) | Elongation in tension (%) | Falling weight impact strength (kg – cm) | 100 | 120 | 140 | |
| — | — | — | — | — | — | — |
| 366 | 210 | 58 | 280 | 910 | 1815 | 2.4 |
| — | — | — | — | — | — | — |
| — | — | — | — | — | — | — |
| 178 | 390 | 145 | 480 | 1490 | 2850 | 0.9 |
| — | — | — | — | — | — | — |
| — | — | — | — | — | — | — |
| 356 | 190 | 37 | 10 | 125 | 665 | 3.1 |
| 347 | 230 | 45 | 20 | 265 | 895 | 2.2 |
| — | — | — | — | — | — | — |
| — | — | — | — | — | — | — |
| 294 | 320 | 84 | 115 | 785 | 1960 | 1.1 |
| — | — | — | — | — | — | — |
| 343 | 270 | 108 | 240 | 960 | 2635 | 1.6 |
| — | — | — | — | — | — | — |
| 402 | <20 | <5 | — | — | — | — |
| — | — | — | — | 10 | 210 | 5.7 |
| — | — | — | 10 | 440 | 2240 | 4.8 |

TABLE 7

| | Components for resin composition | | | | | | | | |
|---|---|---|---|---|---|---|---|---|---|
| | EAA | | PVA | | Polyolefin | | Oxygen permeability 23° C. (cc/m² · day · atm) | Film formability | Film strength (kg · cm/cm) |
| | Species | Amount (parts by weight) | Species | Amount (parts by weight) | Species | Amount (parts by weight) | | | |
| Example 3-1 | EA-1 | 5 | PV-1 | 70 | PO-1 | 25 | 3.4 | ⊙ | 37.4 |
| 2 | 2 | 5 | 1 | 65 | PO-1 | 30 | 3.9 | ⊙ | 48.6 |
| 3 | 4 | 5 | 1 | 50 | PO-1 | 45 | 5.8 | ⊙ | 58.2 |
| 4 | 1 | 5 | 2 | 80 | PO-1 | 15 | 1.2 | ○ | 32.1 |
| 5 | 2 | 30 | 2 | 70 | — | — | 1.9 | ○ | 93.9 |
| 6 | 3 | 75 | 2 | 25 | — | — | 9.8 | ○ | N.B* |
| 7 | 2 | 5 | 1 | 70 | PO-1 | 25 | 4.9 | ⊙ | 45.1 |
| 8 | 1 | 10 | 1 | 60 | PO-1 | 30 | 5.6 | ⊙ | 73.8 |
| 9 | 2 | 5 | 1 | 60 | PO-1 | 35 | 5.4 | ⊙ | 49.2 |
| 10 | 4 | 5 | 1 | 70 | PO-1 | 25 | 3.6 | ⊙ | 34.5 |
| 11 | 2 | 5 | 2 | 70 | PO-3 | 25 | 2.5 | ⊙ | 31.9 |

TABLE 7-continued

| | \multicolumn{6}{c|}{Components for resin composition} | | | |
|---|---|---|---|---|---|---|---|---|---|

| | EAA | | PVA | | Polyolefin | | Oxygen permeability 23° C. (cc/m² · day · atm) | Film formability | Film strength (kg · cm/cm) |
|---|---|---|---|---|---|---|---|---|---|
| | Species | Amount (parts by weight) | Species | Amount (parts by weight) | Species | Amount (parts by weight) | | | |
| 12 | 3 | 5 | 2 | 40 | PO-3 | 55 | 6.8 | ⊚ | 73.9 |
| 13 | 2 | 10 | 2 | 70 | PO-3 | 20 | 2.8 | ○ | 46.5 |
| 14 | 2 | 5 | 3 | 70 | PO-3 | 25 | 3.9 | ○ | 36.8 |
| Comp. Ex. 3-1 | EA-1 | 1 | PV-1 | 65 | PO-1 | 34 | — | x | 13.2 |
| 2 | 3 | 95 | 2 | 5 | — | — | 1510 | ⊚ | N.B |
| 3 | 2 | 100 | — | — | — | — | 1645 | ⊚ | N.B |
| 4 | — | — | PV-1 | 100 | — | — | 2.3 | x | 11.5 |
| 5 | — | — | 2 | 100 | — | — | 2.3 | x | 12.2 |
| 6 | EA-1 | 85 | 2 | 15 | — | — | 186 | ○ | N.B |

*N.B: No breakage

TABLE 8

| | \multicolumn{6}{c}{Components for resin composition} | | | | |
|---|---|---|---|---|---|---|---|---|---|

| | EAA | | PA | | Polyolefin | | \multicolumn{2}{c|}{Oxygen permeability (cc/m² · day · atm)} | Film impact strength (kg · cm/cm) |
|---|---|---|---|---|---|---|---|---|---|
| | Species | Amount (parts by weight) | Species | Amount (parts by weight) | Species | Amount (parts by weight) | 65 RH % | 90 RH % | |
| Example 4-1 | EA-1 | 20 | PA-1 | 80 | — | — | 44.6 | 68.2 | 465 |
| 2 | 2 | 10 | PA-1 | 90 | — | — | 42.2 | 66.9 | 398 |
| 3 | 2 | 40 | PA-1 | 60 | — | — | 48.1 | 73.1 | 509 |
| 4 | 3 | 15 | PA-1 | 85 | — | — | 43.5 | 67.5 | 442 |
| 5 | 5 | 60 | PA-1 | 40 | — | — | 51.2 | 81.3 | 587 |
| 6 | 2 | 5 | PA-1 | 15 | PO-1 | 80 | 64.1 | 88.2 | 292 |
| 7 | 2 | 5 | PA-1 | 40 | PO-1 | 55 | 50.4 | 79.7 | 601 |
| 8 | 4 | 20 | PA-1 | 20 | PO-1 | 60 | 57.3 | 87.4 | 482 |
| 9 | 5 | 40 | PA-1 | 30 | PO-1 | 30 | 53.8 | 84.2 | 538 |
| 10 | 1 | 5 | PA-1 | 25 | PO-1 | 70 | 54.6 | 83.2 | 596 |
| 11 | 3 | 5 | PA-1 | 25 | PO-1 | 70 | 55.7 | 85.6 | 527 |
| Comp. Ex. 4-1 | — | — | PA-1 | 100 | — | — | 41.6 | 65.8 | 226 |
| 2 | EA-2 | 1 | PA-1 | 99 | — | — | 41.9 | 67.2 | 214 |
| 3 | 1 | 90 | PA-1 | 10 | — | — | 246 | 783 | 653 |
| 4 | 3 | 1 | PA-1 | 4 | PO-1 | 95 | >2000 | >2000 | 48.7 |

TABLE 9

| | EAA | | PA | | Polyolefin | | Modified polyolefin | | \multicolumn{2}{c|}{Izod impact strength (notched) (kg · cm/cm)} | Flexural modulus (kg/cm²) |
|---|---|---|---|---|---|---|---|---|---|---|---|
| | Species | Amount (parts by weight) | Species | Amount (parts by weight) | Species | Amount (parts by weight) | Species | Amount (parts by weight) | 23° C. | −30° C. | |
| Example 4-12 | EA-1 | 10 | PA-2 | 65 | PO-3 | 25 | — | — | 5.3 | 3.0 | 12,100 |
| 13 | 2 | 10 | PA-2 | 60 | PO-3 | 30 | — | — | 5.9 | 3.3 | 12,800 |
| 14 | 3 | 20 | PA-2 | 60 | PO-3 | 20 | — | — | 7.2 | 4.1 | 10,100 |
| 15 | 2 | 10 | PA-3 | 60 | PO-3 | 30 | — | — | 6.7 | 4.4 | 18,900 |
| 16 | 2 | 5 | PA-3 | 65 | PO-3 | 30 | — | — | 6.1 | 3.9 | 19,300 |
| 17 | 2 | 15 | PA-2 | 25 | — | — | — | — | N.B | 11.2 | 11,200 |
| | | | PA-3 | 60 | | | | | | | |
| 18 | 5 | 20 | PA-2 | 30 | — | — | — | — | N.B* | 12.3 | 10,900 |
| | | | PA-3 | 50 | | | | | | | |

TABLE 9-continued

| | Components for resin composition | | | | | | | | Izod impact strength (notched) (kg · cm/cm) | | Flexural modulus (kg/cm²) |
|---|---|---|---|---|---|---|---|---|---|---|---|
| | EAA | | PA | | Polyolefin | | Modified polyolefin | | | | |
| | Species | Amount (parts by weight) | Species | Amount (parts by weight) | Species | Amount (parts by weight) | Species | Amount (parts by weight) | 23° C. | −30° C. | |
| 19 | 2 . | 5 | PA-2 | 80 | PO-1 | 15 | — | — | 6.8 | 4.6 | 18,600 |
| Comp.Ex. 4-5 | — | — | PA-2 | 60 | PO-3 | 30 | MP-3 | 10 | 4.7 | 2.6 | 12,100 |
| 6 | — | — | PA-3 | 60 | PO-3 | 30 | MP-3 | 10 | 5.4 | 3.2 | 18,700 |
| 7 | — | — | PA-2 | 25 | — | — | MP-4 | 15 | 15.4 | 9.1 | 10,100 |
| | | | PA-3 | 60 | | | | | | | |
| 8 | — | — | PA-2 | 50 | PO-3 | 40 | MP-4 | 10 | 4.2 | 1.9 | 10,800 |
| 9 | — | — | PA-2 | 100 | — | — | — | — | 1.7 | 1.6 | 27,700 |
| 10 | — | — | PA-2 | 60 | PO-1 | 40 | — | — | 5.4 | 1.9 | 7,200 |

*N.B: No breakage

TABLE 10

| Example and Comparative Example | Components for resin composition | | | | | | Film property | | Number of flexing until occurrence of pinholes | mechanical strength | |
|---|---|---|---|---|---|---|---|---|---|---|---|
| | EAA | | EVOH | | PO | | Oxygen permeability (cc/m² · day · atm) | | Film impact strength (kg · cm/cm) | Izod Impact strength (notched) (kg · cm/cm) | Flexural modulus (kg/cm²) |
| | Species | Amount (parts by weight) | Species | Amount (parts by weight) | Species | Amount (parts by weight) | 65 RH % | 90 RH % | | | |
| Example 5-1 | EA-1 | 5 | EV-1 | 95 | — | — | 1.18 | 3.4 | 49.6 | 100 | 2.3 | 37,000 |
| 2 | EA-1 | 10 | EV-1 | 90 | — | — | 1.25 | 3.4 | 64.1 | 300 | 4.6 | 34,100 |
| 3 | EA-1 | 20 | EV-1 | 80 | — | — | 1.41 | 4.3 | 94.9 | 600 | 9.2 | 29,200 |
| 4 | EA-1 | 50 | EV-1 | 50 | — | — | 5.6 | 10.8 | 104*¹ | 800 | N.B*² | — |
| 5 | EA-1 | 70 | EV-1 | 30 | — | — | 6.3 | 14.1 | 256*¹ | 1000 | N.B*² | — |
| 6 | EA-2 | 10 | EV-2 | 90 | — | — | 3.2 | 9.1 | 46.2 | — | 4.2 | 34,500 |
| 7 | EA-2 | 50 | EV-2 | 50 | — | — | 9.3 | 18.2 | 99.1 | — | — | — |
| 8 | EA-2 | 5 | EV-1 | 95 | — | — | — | — | — | — | 2.7 | 38,000 |
| 9 | EA-2 | 20 | EV-1 | 80 | — | — | — | — | — | — | 5.9 | 31,700 |
| 10 | EA-7 | 5 | EV-1 | 95 | — | — | 0.85 | 3.6 | 47.8 | — | — | — |
| 11 | EA-7 | 10 | EV-1 | 90 | — | — | 1.10 | 4.3 | 62.7 | — | — | — |
| 12 | EA-8 | 10 | EV-1 | 90 | — | — | 1.09 | 3.4 | 51.2 | — | — | — |
| Example 13 | EA-9 | 5 | EV-3 | 95 | — | — | 0.98 | 3.1 | 53.1 | 200 | 2.5 | 36,000 |
| 14 | EA-9 | 10 | EV-3 | 90 | — | — | 1.1 | 3.4 | 68.7 | — | 4.8 | 33,700 |
| 15 | EA-10 | 5 | EV-3 | 95 | — | — | 0.91 | 3.4 | 54.7 | — | 2.8 | 37,200 |
| 16 | EA-10 | 10 | EV-3 | 90 | — | — | 1.1 | 4.1 | 69.1 | 400 | — | — |
| 17 | EA-11 | 20 | EV-3 | 80 | — | — | 1.2 | 4.3 | 96.3 | 600 | — | — |
| 18 | EA-11 | 50 | EV-3 | 50 | — | — | 8.9 | 16.3 | 96.8 | 900 | N.B | 21,500 |
| 19 | EA-2 | 5 | EV-1 | 10 | PO-1 | 85 | 101.3 | — | 130.5 | — | — | — |
| 20 | EA-2 | 5 | EV-1 | 40 | PO-1 | 55 | 6.3 | — | 73.3 | — | — | — |
| 21 | EA-2 | 5 | EV-1 | 80 | PO-1 | 15 | 1.1 | — | 48.2 | — | — | — |
| Comp.Ex. 5-1 | — | — | EV-1 | 100 | — | — | 0.77 | 1.84 | 32 | 5 | 1.3 | 40,200 |
| 2 | — | — | EV-2 | 100 | — | — | 2.3 | 6.4 | 44 | — | — | — |
| 3 | EA-1 | 100 | — | — | — | — | 1645 | >2000 | N.B*² | — | — | — |

*¹measured with a ½ inch diameter ball
*¹No breakage

TABLE 11

| | Components for resin composition | | | | | | | | | |
|---|---|---|---|---|---|---|---|---|---|---|
| | EAA | | EVOH | | Polyolefin | | Modified polyolefin | | State of sheet film | Izod impact strength (notched) (kg · cm/cm) | Flexural modulus (kg/cm²) |
| | Species | Amount (parts by weight) | Species | Amount (parts by weight) | Species | Amount (parts by weight) | Species | Amount (parts by weight) | | | |
| Example 6-1 | EA-1 | 5 | EV-4 | 9.5 | PO-4 | 81 | MP-2 | 4.5 | A | — | — |
| 2 | 2 | 5 | EV-4 | 10 | PO-4 | 80 | MP-2 | 5 | A | 3.6 | 14,600 |
| 3 | 10 | 5 | EV-4 | 10 | PO-4 | 80 | MP-2 | 5 | A | 3.9 | 14,200 |
| 4 | 10 | 2 | EV-4 | 10 | PO-4 | 83 | MP-2 | 5 | B | — | — |
| 5 | 2 | 10 | EV-4 | 15 | PO-4 | 70 | MP-2 | 5 | A | 6.4 | 13,100 |
| 6 | 2 | 5 | EV-4 | 15 | PO-4 | 70 | MP-2 | 10 | A | — | — |
| 7 | 10 | 5 | EV-4 | 10 | PO-1 | 80 | MP-1 | 5 | A | 5.9 | 8,600 |
| 8 | 3 | 10 | EV-4 | 10 | PO-1 | 70 | MP-1 | 10 | A | — | — |
| 9 | 4 | 2 | EV-4 | 10 | PO-1 | 83 | MP-1 | 5 | B | — | — |
| 10 | 2 | 5 | EV-4 | 15 | PO-1 | 75 | EN-1 | 5 | B | 5.1 | 9,700 |
| 11 | 2 | 20 | EV-4 | 10 | PO-1 | 60 | EN-2 | 10 | A | 9.2 | 8,400 |
| 12 | 2 | 5 | EV-4 | 10 | PO-1 | 85 | — | — | A | — | — |
| Comp. Ex. 6-1 | — | — | EV-4 | 10 | PO-4 | 85 | MP-2 | 5 | D | — | — |
| 2 | — | — | EV-4 | 10 | PO-4 | 90 | — | — | D | 1.7 | 10,600 |
| 3 | — | — | EV-4 | 10 | PO-4 | 85 | MP-2 | 5 | C | 1.3 | 11,800 |
| 4 | — | — | EV-4 | 10 | PO-1 | 90 | — | — | D | 2.6 | 7,200 |
| 5 | — | — | EV-4 | 10 | PO-1 | 85 | EN-1 | 5 | D | 3.8 | 7,800 |
| 6 | — | — | EV-4 | 10 | PO-1 | 80 | — | — | D | 4.3 | 6,300 |

TABLE 12

| | B layer | | Oxygen permeability before retort treatment (cc/package · day · atm) | Oxygen permeability after retort treatment (cc/package · day · atm) | Remarks |
|---|---|---|---|---|---|
| | EAA | ER-1 | | | |
| | Species | Amount (parts by weight) | Amount (parts by weight) | | | |
| Example 7-1 | EA-2 | 100 | — | 0.01 | 0.013 | 9 layers of 4 species Inner PP/AD/B/AD/EV/AD/B/AD/ Outer PP = 425/10/20/10/30/10/20/ 10/425 μm, each in thickness |
| 2 | EA-1 | 100 | — | 0.01 | 0.24 | |
| 3 | EA-3 | 100 | — | 0.01 | 0.15 | |
| 4 | EA-4 | 100 | — | 0.01 | 0.29 | |
| 5 | EA-10 | 100 | — | 0.01 | 0.21 | |
| 6 | EA-1 | 35 | 65 | 0.01 | 0.12 | 5 layers of 3 species Inner PP/B(AD)/EV/B(AD)/Outer PP = 425/20/30/20/425 μm, each in thickness |
| 7 | 2 | 20 | 80 | 0.01 | 0.21 | |
| 8 | 2 | 50 | 50 | 0.01 | 0.07 | |
| 9 | 3 | 30 | 70 | 0.01 | 0.23 | |
| 10 | 3 | 10 | 90 | 0.01 | 0.26 | |
| 11 | 10 | 25 | 75 | 0.01 | 0.14 | |
| Comp. Ex. 7-1 | — | — | — | 0.01 | 0.84 | 5 layers of 3 species Inner PP/AD/EV/AD/Outer PP = 455/10/30/10/455 μm, each in thickness |
| 2 | EA-2 | 1 | 99 | 0.01 | 0.89 | 5 layers of 3 species Inner PP/B(AD)/EV/B(AD)/Outer PP = 425/20/30/20/425 μm, each in thickness |
| 3 | EA-10 | 90 | 10 | 0.01 | 0.08* | |

*Peeling occurred after retort treatment

What is claimed:

1. A method of preparing a thermoplastic polypropylene film having improved transparency, which comprises:

melt mixing 1 to 70% by weight, based on the weight of the polypropylene, of a copolymer prepared by radical polymerization at a temperature of 100° to 300° C. under a pressure of 700 to 3,000 atom of ethylene and 0.01 to 50% by weight of at least one of an N-alkyl- or N,N-dialkyl-(meth)acrylamide, to form a thermoplastic resin composition;

and molding the thermoplastic resin composition to form the thermoplastic polypropylene film having improved transparency.

2. A multilayered laminate comprising:

at least one resin layer comprising a copolymer prepared by radical polymerization at a temperature of 100° to 300° C. under a pressure of 700 to 3,000 atom of ethylene and at least one of N-alkyl- or N,N-dialkyl-(meth)acrylamide;

a layer of a thermoplastic resin selected from the group consisting of polyolefins, polyvinyl alcohols, polyamides, saponified olefin/vinyl acetate copolymers, and polymers containing units of an unsaturated carboxylic acid or anhydride; and a hygroscopic gas barrier layer as an intermediate layer between the at least one resin layer and the layer of the thermoplastic resin.

3. A multilayered laminate according to claim 2, wherein the at least one resin layer additionally comprises a thermoplastic resin containing 0.01 to 20% by weight of structural units from an unsaturated dicarboxylic acid or anhydride.

4. A multilayered laminate according to claim 2, wherein the hygroscopic gas barrier layer is a layer of at least one of a saponification product of olefin/vinyl acetate copolymer or a polyamide.

* * * * *